US010940474B2

(12) United States Patent
Nann et al.

(10) Patent No.: US 10,940,474 B2
(45) Date of Patent: Mar. 9, 2021

(54) OXIDANT SENSOR

(71) Applicant: University of South Australia, Adelaide (AU)

(72) Inventors: Thomas Nann, Brooklyn (NZ); Luke Andrew Parkinson, Kensington Park (AU); Sait Elmas, Para Hills West (AU); Craig Ian Priest, Athelstone (AU); Vasil Rosenov Vasilev, Varna (BG)

(73) Assignee: University of South Australia, Adelaide (AU)

( * ) Notice: Subject to any disclaimer, the term of this patent is extended or adjusted under 35 U.S.C. 154(b) by 168 days.

(21) Appl. No.: 16/086,772

(22) PCT Filed: Mar. 20, 2017

(86) PCT No.: PCT/AU2017/000067
§ 371 (c)(1),
(2) Date: Sep. 20, 2018

(87) PCT Pub. No.: WO2017/161407
PCT Pub. Date: Sep. 28, 2017

(65) Prior Publication Data
US 2019/0039068 A1 Feb. 7, 2019

(30) Foreign Application Priority Data
Mar. 21, 2016 (AU) .................... 2016901055

(51) Int. Cl.
*G01N 21/05* (2006.01)
*G01N 21/78* (2006.01)
(Continued)

(52) U.S. Cl.
CPC ........ *B01L 3/502746* (2013.01); *G01N 21/05* (2013.01); *G01N 21/78* (2013.01);
(Continued)

(58) Field of Classification Search
CPC ..... B01L 2300/0816; B01L 2300/0867; B01L 2300/0874; B01L 2300/0883;
(Continued)

(56) References Cited

U.S. PATENT DOCUMENTS

2013/0330245 A1* 12/2013 Duncan .............. G01N 21/0303
422/502
2014/0219872 A1 8/2014 Angelescu et al.
(Continued)

FOREIGN PATENT DOCUMENTS

CN 101806715 A 8/2010

OTHER PUBLICATIONS

Asakai et al., "Investigation of iodine liberation process in redox titration of potassium iodate with sodium thiosulfate", Analytica Chimica Acta, 2011, pp. 34-38, vol. 689.
(Continued)

*Primary Examiner* — Jennifer Wecker
(74) *Attorney, Agent, or Firm* — The Webb Law Firm

(57) ABSTRACT

A microfluidic device for measuring an amount of an oxidant in a solution is disclosed. The device includes a microfluidic substrate configured to mix a solution sample to be analysed with an indicator dye solution containing an indicator dye under conditions suitable for some of the indicator dye to react with any oxidant in the solution to produce an oxidant measurement solution having a reduced indicator dye concentration that is indicative of the amount of oxidant in the solution, the microfluidic substrate including an optical reading window through which the reduced indicator dye concentration in the oxidant measurement solution can be measured optically.

10 Claims, 18 Drawing Sheets

(51) Int. Cl.
  *G01N 31/22* (2006.01)
  *B01L 3/00* (2006.01)
(52) U.S. Cl.
  CPC .... *G01N 31/224* (2013.01); *B01L 2300/0816* (2013.01); *B01L 2300/0867* (2013.01); *B01L 2300/0874* (2013.01); *B01L 2300/0883* (2013.01); *B01L 2300/0887* (2013.01); *B01L 2300/168* (2013.01)
(58) Field of Classification Search
  CPC ....... B01L 2300/0887; B01L 2300/168; B01L 3/502746; G01N 21/05; G01N 21/78; G01N 31/224
  See application file for complete search history.

(56) References Cited

U.S. PATENT DOCUMENTS

2015/0147769 A1  5/2015  Kim et al.
2016/0258899 A1*  9/2016  Patolsky ................ C12Q 1/004

OTHER PUBLICATIONS

"Standard Test Methods of Sampling and Chemical Analysis of Chlorine-Containing Bleaches", ASTM International, Jul. 2008, West Conshohocken, PA.
Black and Veatch Corporation, "Determination of Chlorine Residuals in Water and Wastewater Treatment", White's Handbook of Chlorination and Alternative Disinfectants, 2010, Chapter 3, pp. 174-229, 5th Edition.
Boily et al., "On the Dissociation of Methyl Orange: Spectrophotometric Investigation in Aqueous Solutions from 10 to 90° C. and Theoretical Evidence for Intramolecular Dihydrogen Bonding", Journal of Solution Chemistry, 2005, pp. 1387-1406, vol. 34, No. 12.
Chen et al., "A Rapid and Low-Cost Procedure for Fabrication of Glass Microfluidic Devices", Journal of Microelectromechanical Systems, 2007, pp. 1193-2000, vol. 16, No. 5.
Duffy et al., "Rapid Prototyping of Microfluidic Systems in Poly(dimethylsiloxane)", Analytical Chemistry, 1998, pp. 4974-4984, vol. 70, No. 23.
Engelhardt et al., "Chlorination, Chloramination and Chlorine Measurement", Hach, 2015, Loveland, CO.
Laitinen et al., "Simultaneous Determination of Bromine and Chlorine with Methyl Orange", Analytical Chemistry, 1972, pp. 920-926, vol. 44, No. 6.
"Swimming Pool and Spa Water Chemistry", Missouri Department of Health and Senior Services Section for Environmental Public Health.
Reichenbacher et al., "Challenges in Analytical Quality Assurance", 2011, Springer, Berlin, Germany.
Shi et al., "Highly parallel mix-and-match fabrication of nanopillar arrays integrated in microfluidic channels for long DNA molecule separation", Applied Physics Letters, 2007, vol. 91, Article No. 153114.
Sollo et al., "Colorimetric Methods for Bromine", Environmental Science & Technology, 1971, pp. 240-246, vol. 5, No. 3.
Sollo Jr. et al., "Determination of Free Chlorine by Methyl Orange", Journal (American Water Works Association), 1965, pp. 1575-1585, vol. 57, No. 12.
Taras, "Colorimetric Determination of Free Chlorine with Methyl Orange", Analytical Chemistry, 1947, pp. 342-343, vol. 19, No. 5.

* cited by examiner (a) (b)

OXIDANT SENSOR

CROSS-REFERENCE TO RELATED APPLICATIONS

This application is the United States national phase of International Application No. PCT/AU2017/000067 filed Mar. 20, 2017, and claims priority to Australian Provisional Patent Application No. 2016901055 filed Mar. 21, 2016, the disclosures of which are hereby incorporated in their entirety by reference.

BACKGROUND OF THE INVENTION

Field of the Invention

The present disclosure relates to devices, apparatus and methods for measuring the amount of an oxidant in a solution, such as the amount of chlorine in a solution. More particularly the present disclosure relates to devices, apparatus and methods for the colourimetric measurement of the concentration of free, combined and/or total chlorine in aqueous solutions.

Description of Related Art

In various endeavours, there is a need to measure the amount of an oxidising agent in a solution. For example, there may be a need to measure the amount of chlorine, oxygen, metal-containing oxidants, hydrogen peroxide, organic peroxides or singlet oxygen in a solution. One way of measuring the amount of oxidant in a solution is to expose an oxidant containing solution to a known amount of a dye which can be oxidised by the oxidant to produce an amount of an oxidised dye that is proportional to the amount of oxidant in solution. Typically, the oxidised dye absorbs light at different wavelength(s) than the parent dye and a reduction in absorbance of the parent dye or an increase in absorbance of the oxidised dye can be used to measure the amount of oxidant in solution.

One non-limiting example of an oxidant whose concentration in solution needs to be routinely measured is chlorine. Chlorine, in one form or another, is often used as a disinfectant for the treatment of water. Such treatment can include disinfecting municipal water, treating swimming pools, disinfecting articles that come into contact with water, and many other applications in which it is desirable to kill bacteria in water. The amount of organic and inorganic matter in a water body that can react with an amount of chlorine is called the "chlorine demand". Upon chlorine addition, after the chlorine demand is satisfied, the excess chlorine is referred to as "residual chlorine". In an ever-changing water environment, like a swimming pool, the residual chlorine is available to react with germs, sweat, oils, urine, etc. and it is often called "available chlorine". For a swimming pool to be ready for use the operator should maintain a delicate "water balance"—the chlorine amount, total alkalinity, calcium hardness, pH and total dissolved solids must be within specified lower and upper limits[1].

Aqueous chlorine exists primarily as hypochlorous acid (HOCl) and hypochlorite ion (OCl⁻) and the relative ratio of hypochlorite ion to hypochlorous acid is related to the pH of the solution. The additive concentration of the two moieties is referred to as "free chlorine". Organic nitrogen-containing species, like amines, amino-acids, proteins and urea, that are introduced into a water body through sweat, urine, hair, etc. react with "free chlorine" to form organic/inorganic chloramines. The total chloramine concentration is called "combined chlorine". The sum of "combined" and "free chlorine" concentration is called "total chlorine". The "free", "combined" and "total chlorine" concentration are measured as "mg/L (ppm) as $Cl_{2(aq.)}$", comparing the relative oxidizing capacity of the water relative to a solution of pure $Cl_{2(aq)}$.[2] The germicide power of "combined chlorine" is much lower than "free chlorine"; additionally, "combined chlorine" has an objectionable taste and odour and can cause irritation of the eyes of swimmers:[1,2] Thus, when the "combined chlorine" concentration is over the upper limit or the "free chlorine" concentration is under the lower limit the operator needs to take measures. Therefore, there is a need to reliably and accurately measure the chlorine concentration to inform a decision.

Numerous methods for the measurement of the residual chlorine have been developed. Amperiometric methods are considered the benchmark against which aqueous chlorine samples are tested.[2] Amperiometric methods can be used for the continuous determination of free chlorine. However, amperiometric methods have a relatively higher cost and require greater operator skill; additionally, there is a greater interference from pH, T, p and chlorine concentration. These methods cannot accommodate abrupt changes in chlorine concentration and are not suitable for field use.[3] A similar method is the non-selective electrode ORP (oxidation reduction potential) method.[2] However, the ORP method cannot differentiate between free and combined chlorine and therefore the correlation between disinfection efficiency and ORP is poor. Additionally, the electrodes used in the ORP method are subject to drift, fouling and poisoning.[2]

Methods for chlorine measurement that are more suitable for home or in-field use are based on measuring changes in the concentration of a dye after exposure of the dye to a chlorine containing solution. Diethyl-1,4-phenylenediamine (DPD) is a dye that is commonly used for chlorine detection in swimming pools. There are some shortcomings with the use of DPD for continuous chlorine monitoring, namely the reagent is unstable and needs to be buffered, only a narrow range of chlorine concentration (i.e. 0-5 ppm) can be measured, and chloramines interfere with the measurements.

The colorimetric determination of free chlorine with acidified methyl orange (MO) is another method that can be used. There are several advantages of MO for the continuous monitoring of chlorine: the reagent is stable indefinitely, MO is a readily available, interference from iron, nitrite and chloramines is negligible[5] and the chloramine (total chlorine) detection can be accelerated with the addition of bromide ions (Br⁻).

In general, prior art free chlorine sensors needed to be paired with some form of pH compensation because free chlorine exists as hypochlorite ion and hypochlorous acid with the relative ratio of the two being dependent upon the pH of the solution. Below pH 6, free chlorine is effectively 100% hypochlorous acid, while above pH 10, free chlorine is effectively 100% hypochlorite ion. The requirement that pH must be known to some degree complicates chlorine measurement and increases the expense of measurement systems.

There is a need for chlorine sensors that are simple to use and easily serviced. Alternatively, or in addition, there is a need for chlorine sensors that can be operated without the additional need to determine or change pH.

SUMMARY OF THE INVENTION

In a first aspect, provided herein is a microfluidic device for measuring an amount of an oxidant in a solution, the device comprising: a microfluidic substrate configured to mix a solution sample to be analysed with an indicator dye solution containing an indicator dye under conditions suitable for some of the indicator dye to react with any oxidant in the solution to produce an oxidant measurement solution having a reduced indicator dye concentration that is indicative of the amount of oxidant in the solution, the microfluidic substrate comprising an optical reading window through which the reduced indicator dye concentration in the oxidant measurement solution can be measured optically.

The oxidant to be measured can be any oxidant that is capable of reacting with the indicator dye. For example, the oxidant may be chlorine, oxygen, metal-containing oxidants, hydrogen peroxide, organic peroxides or singlet oxygen. The indicator dye may be chosen to be selective to a specific oxidant.

In certain embodiments of the first aspect, the microfluidic device comprises a measuring chamber comprising the optical reading window and configured to receive the oxidant measurement solution and through which the first reduced indicator dye concentration in the oxidant measurement solution can be measured optically.

In certain embodiments, the oxidant is chlorine. The microfluidic device of these embodiments can be used to measure an amount of free chlorine, combine chlorine and/or total chlorine in a solution.

Thus, in a second aspect provided herein is a microfluidic device for measuring an amount of free chlorine in an aqueous sample, the device comprising: a microfluidic substrate configured to mix the aqueous sample to be analysed with an indicator dye solution containing an indicator dye under conditions suitable for some of the indicator dye to react with any free chlorine in the aqueous sample to produce a free chlorine measurement solution having a reduced indicator dye concentration that is indicative of the amount of chlorine in the aqueous sample, the microfluidic substrate comprising an optical reading window through which the reduced indicator dye concentration in the free chlorine measurement solution can be measured optically.

In certain embodiments of the second aspect, the microfluidic device comprises a measuring chamber comprising the optical reading window and configured to receive the free chlorine measurement solution and through which the first reduced indicator dye concentration in the free chlorine measurement solution can be measured optically.

For certain applications, such as measuring chlorine levels in swimming pool water or municipal water, there is a need to measure the level of both free chlorine and combined chlorine in a sample. The microfluidic device described generally herein can be configured to measure both. Thus, in a third aspect provided herein is a microfluidic device for measuring free chlorine and combined chlorine in an aqueous sample, the device comprising:

a microfluidic free chlorine measurement module configured to mix an aqueous sample to be analysed with an indicator dye solution containing an indicator dye under conditions suitable for some of the indicator dye to react with any free chlorine in the aqueous sample to produce a free chlorine measurement solution having a first reduced indicator dye concentration that is indicative of the free chlorine concentration in the aqueous sample, the free chlorine measurement module comprising an optical reading window through which the first reduced indicator dye concentration in the free chlorine measurement solution can be measured optically; and a microfluidic combined chlorine measurement module configured to mix the free chlorine measurement solution from the free chlorine measurement microfluidic module with a fluid containing a combined chlorine release agent under conditions suitable for the combined chlorine release agent to react with any combined chlorine in the free chlorine measurement solution to produce liberated chlorine from the combined chlorine and for the indicator dye in the free chlorine measurement solution to react with any liberated chlorine to produce a combined chlorine measurement solution having a second reduced indicator dye concentration that is indicative of the combined chlorine concentration in the aqueous sample, the combined chlorine measurement module comprising an optical reading window through which the second reduced indicator dye concentration in the combined chlorine measurement solution can be measured optically.

In certain embodiments of the third aspect, the microfluidic free chlorine measurement module comprises a measuring chamber comprising the optical reading window and configured to receive the free chlorine measurement solution and through which the first reduced indicator dye concentration in the free chlorine measurement solution can be measured optically and the microfluidic combined chlorine measurement module comprises a measuring chamber comprising the optical reading window and configured to receive the combined chlorine measurement solution and through which the second reduced indicator dye concentration in the combined chlorine measurement solution can be measured optically.

In a fourth aspect provided herein is a microfluidic device for measuring an amount of total chlorine in an aqueous sample, the device comprising: a microfluidic substrate configured to mix the aqueous sample to be analysed with a fluid containing a total chlorine release agent under conditions suitable for the total chlorine release agent to react with any total chlorine in the aqueous sample to produce a liberated chlorine solution comprising chlorine liberated from the total chlorine and also configured to mix the liberated chlorine solution with an indicator dye solution under conditions for the indicator dye to react with any liberated chlorine in the liberated chlorine solution to produce a total chlorine measurement solution having a reduced indicator dye concentration that is indicative of the total chlorine concentration in the aqueous sample, the microfluidic substrate comprising an optical reading window through which the reduced indicator dye concentration in the total chlorine measurement solution can be measured optically.

In certain embodiments of the fourth aspect, the microfluidic device comprises a measuring chamber comprising the optical reading window and configured to receive the total chlorine measurement solution and through which the reduced indicator dye concentration in the total chlorine measurement solution can be measured optically.

For certain applications, such as measuring chlorine levels in swimming pool water or municipal water, the levels of free chlorine and combined chlorine in a sample can alternatively be determined by measuring the amount of free chlorine and the total chlorine in a sample. The microfluidic device described generally herein can be configured to measure both free chlorine and total chlorine in an aqueous sample. Thus, in a fifth aspect provided herein is a microfluidic device for measuring free chlorine and total chlorine in an aqueous sample, the device comprising:

a microfluidic free chlorine measurement module configured to mix an aqueous sample to be analysed with an indicator dye solution containing an indicator dye under conditions suitable for some of the indicator dye to react with any free chlorine in the aqueous sample to produce a free chlorine measurement solution having a reduced indicator dye concentration that is indicative of the free chlorine concentration in the aqueous sample, the free chlorine measurement module comprising an optical reading window through which the first reduced indicator dye concentration in the free chlorine measurement solution can be measured optically; and a microfluidic total chlorine measurement module configured to mix the free chlorine measurement solution from the free chlorine measurement microfluidic module with a fluid containing a total chlorine release agent under conditions suitable for the total chlorine release agent to react with any total and/or bound chlorine in the free chlorine measurement solution to produce a liberated chlorine solution comprising chlorine liberated from the total chlorine and for an indicator dye solution containing an indicator dye to mix with the liberated chlorine solution under conditions suitable for some of the indicator dye to react with any liberated chlorine in the liberated chlorine solution to produce a total chlorine measurement solution having a reduced indicator dye concentration that is indicative of the total chlorine concentration in the aqueous sample, the total chlorine measurement module comprising an optical reading window through which the reduced indicator dye concentration in the total chlorine measurement solution can be measured optically.

In certain embodiments of the fifth aspect, the microfluidic free chlorine measurement module comprises a measuring chamber comprising the optical reading window and configured to receive the free chlorine measurement solution and through which the first reduced indicator dye concentration in the free chlorine measurement solution can be measured optically and the microfluidic total chlorine measurement module comprises a measuring chamber comprising the optical reading window and configured to receive the total chlorine measurement solution and through which the second reduced indicator dye concentration in the total chlorine measurement solution can be measured optically.

In certain embodiments of the fifth aspect, the microfluidic free chlorine measurement module and the microfluidic total chlorine measurement module are a single module.

In a sixth aspect, provided herein is a microfluidic device for measuring free chlorine and combined chlorine in an aqueous sample, the device comprising a microfluidic free chlorine measurement module and a microfluidic combined chlorine measurement module, the free chlorine measurement module comprising a solid substrate comprising:
an aqueous sample inlet port configured to receive an aqueous sample to be analysed for free chlorine and combined chlorine,
an indicator dye solution inlet port configured to receive an indicator dye solution containing an indicator dye capable of reacting with any free chlorine in the aqueous sample to produce a first reduced indicator dye concentration that is indicative of the free chlorine concentration in the aqueous sample,
a first microfluidic flow channel in fluid communication with the aqueous sample inlet port and the indicator dye solution inlet port and configured to mix the aqueous sample and the indicator dye solution and to flow the combined fluids along the channel under conditions suitable for the indicator dye to react with any free chlorine and produce a free chlorine measurement solution having a first reduced indicator dye concentration,
a free chlorine measuring chamber in fluid connection with the first microfluidic flow channel at a downstream end thereof and configured to receive the free chlorine measurement solution, the free chlorine measuring chamber comprising an optical reading window through which the first reduced indicator dye concentration in the free chlorine measurement solution can be measured optically,
a transfer port in fluid communication with the free chlorine measuring chamber and/or the first microfluidic channel and configured to transfer the free chlorine measurement solution from the free chlorine measurement module to the combined chlorine measurement module, the combined chlorine measurement module comprising a solid substrate comprising:
a free chlorine measurement solution inlet port configured to receive the free chlorine measurement solution from the transfer port,
a combined chlorine release agent inlet port configured to receive a solution containing a combined chlorine release agent capable of reacting with any combined chlorine in the free chlorine measurement solution to produce liberated chlorine from the combined chlorine,
a second microfluidic flow channel in fluid communication with the free chlorine measurement solution inlet port and the combined chlorine release agent inlet port and configured to mix the free chlorine measurement solution and the solution containing the combined chlorine release agent and to flow the combined fluids along the channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample,
a combined chlorine measuring chamber in fluid connection with the second microfluidic channel at a downstream end thereof and configured to receive the combined chlorine measurement solution, the combined chlorine measuring chamber comprising an optical reading window through which the second reduced indicator dye concentration in the combined chlorine measurement solution can be measured optically, and
a waste outlet port in fluid communication with the combined chlorine measuring chamber and/or the second microfluidic channel and configured to allow the combined chlorine measurement solution to exit the device.

In certain embodiments of the third and sixth aspects, the microfluidic device is a unitary device comprising the microfluidic free chlorine measurement module and the microfluidic combined chlorine measurement module. In these embodiments, the microfluidic device may be a multilayer microfluidic device comprising first and second outer chips and first and second intermediate chips and wherein the free chlorine measurement module is formed between the first outer chip and the first intermediate chip, and the combined chlorine measurement module is formed between the second intermediate chip and the second outer chip. The aqueous sample inlet port, the indicator dye solution inlet port and the combined chlorine release agent inlet port may be formed in the first outer chip. The transfer port and the free chlorine measurement solution inlet port may be formed between the first intermediate plate and the second intermediate plate. The free chlorine measuring chamber forms the transfer port and the free chlorine measurement solution inlet port.

In certain embodiments of the third and sixth aspects, the microfluidic device comprises two or more microfluidic substrates connected in series or parallel, with at least one of the substrates comprising the microfluidic free chlorine measurement module and at least one of the other substrates comprising the microfluidic combined chlorine measurement module.

The combined chlorine release agent of the third and sixth aspects may be any reagent that releases chemically bound chlorine or forms activated bound chlorine, such as bromochloramine. In certain embodiments, the combined chlorine release agent comprises a solution containing bromide ions ($Br^-$), such as a potassium bromide (KBr) solution.

In certain embodiments of the sixth aspect, the first microfluidic flow channel is configured so that the aqueous sample and the indicator dye solution have a residence time of from about 0.5 minutes to about 5 minutes at the specific flow rate used.

In certain embodiments of the sixth aspect, the second microfluidic flow channel is configured so that the free chlorine measurement solution and the solution containing the combined chlorine release agent have a residence time of from about 1.5 minutes to about 10 minutes at the specific flow rate used.

In a seventh aspect, provided herein is a microfluidic device for measuring free chlorine and total chlorine in an aqueous sample, the device comprising a solid substrate comprising:
  an aqueous sample inlet port configured to receive an aqueous sample to be analysed for free chlorine and combined chlorine,
  a total chlorine release agent inlet port configured to receive a total chlorine release agent solution containing a total chlorine release agent capable of reacting with total combined and/or bound chlorine in the free chlorine measurement solution to produce a liberated total chlorine solution comprising chlorine liberated from the total chlorine,
  an indicator dye solution inlet port configured to receive an indicator dye solution containing an indicator dye capable of reacting with any free chlorine in the aqueous sample to produce a first reduced indicator dye concentration that is indicative of the free chlorine concentration in the aqueous sample, and/or capable of reacting with any liberated chlorine in the total chlorine solution to produce a second reduced indicator dye concentration that is indicative of the total chlorine concentration in the aqueous sample,
  a microfluidic flow channel in fluid communication with the aqueous sample inlet port, the total chlorine release agent inlet port and the indicator dye solution inlet port and configured to mix the aqueous sample and the indicator dye solution and to flow the combined fluids along the channel under conditions suitable for the indicator dye to react with any free chlorine and produce a free chlorine measurement solution having a first reduced indicator dye concentration,
  a free chlorine measuring chamber in fluid connection with the microfluidic flow channel at a downstream end thereof and configured to receive the free chlorine measurement solution, the free chlorine measuring chamber comprising an optical reading window through which the first reduced indicator dye concentration in the free chlorine measurement solution can be measured optically,
  the microfluidic flow channel also configured to mix the free chlorine measurement solution with the total chlorine release agent solution after the free chlorine measurement solution has been measured optically and to flow the combined fluids along the channel under conditions suitable for the total chlorine release agent to react with any combined and/or bound chlorine in the free chlorine measurement solution to produce a liberated total chlorine solution comprising chlorine liberated from the total chlorine, and to mix the liberated total chlorine solution and the indicator dye solution and to flow the combined fluids along the channel under conditions suitable for the indicator dye to react with any liberated total chlorine and produce a total chlorine measurement solution having a second reduced indicator dye concentration,
  a total chlorine measuring chamber in fluid connection with the microfluidic flow channel at a downstream end thereof and configured to receive the total chlorine measurement solution, the total chlorine measuring chamber comprising an optical reading window through which the second reduced indicator dye concentration in the total chlorine measurement solution can be measured optically, and
  a waste outlet port in fluid communication with the microfluidic flow channel and configured to allow the free chlorine measurement solution and/or the total chlorine measurement solution to exit the device.

In certain embodiments of the seventh aspect, the free chlorine measuring chamber and the total chlorine measuring chamber are the same.

In certain embodiments of the fifth and seventh aspects, the microfluidic device comprises two or more microfluidic substrates connected in series or parallel, with at least one of the substrates comprising the microfluidic free chlorine measurement module and at least one of the other substrates comprising the microfluidic total chlorine measurement module.

The total chlorine release agent of the fifth and seventh aspects may be any reagent that binds free chlorine that has reacted with the indicator dye solution to form bound free chlorine and then releases chlorine from the bound free chlorine and any combined chlorine. In certain embodiments, the total chlorine release agent comprises a solution containing ammonium ions ($NH4^-$) and bromide ions ($Br^-$), such as an ammonium chloride ($NH_4Cl$) and potassium bromide (KBr) solution.

In certain embodiments of the first to seventh aspects, the indicator dye is selected from the group consisting of: an organic azo dye, an organic amine dye, and a thioninium dye. Exemplary organic azo dyes include sodium 4-[(4-dimethylamino)phenyldiazenyl]benzenesulfonate (i.e. methyl orange). Exemplary organic amine dyes include DPD. Exemplary thioninium dyes include methylene blue.

The concentration of the indicator dye in the solution containing the indicator dye may be known and may be from about 1 ppm to about 1000 ppm. In certain embodiments, the concentration of the indicator dye in the solution containing a known concentration of indicator dye may be selected from the group consisting of: 20, 30, 40 and 50 ppm. Alternatively, the absorbance of the indicator dye solution may be measured before the solution is brought into contact with the solution sample or the aqueous sample. The absorbance may be measured using a reference measurement chamber as described in further detail below.

In certain embodiments, the concentration of indicator dye is measured optically by measuring absorbance of the solution at a wavelength of from about 250 to about 600 nm. Advantageously, the absorbance of the solution may be measured at a wavelength that corresponds with an isosbestic point where the absorbance does not substantially depend on the pH of the solution.

In certain embodiments of the first to seventh aspects, the device further comprises a reference measurement chamber configured to contain a sample of the indicator dye solution before it is contacted with the solution sample or the aqueous sample and to allow the absorbance of the indicator dye solution to be measured prior to contact with the solution sample or the aqueous sample so that it can be used as a reference for measurement. In these embodiments, any concentration of indicator dye could be used if the absorbance of the indicator dye solution before contact with the solution sample or the aqueous sample is measured.

In an eighth aspect, provided herein is an apparatus for measuring an amount of an oxidant in a solution, the apparatus comprising the microfluidic device of the first aspect and one or more pumps configured to pump the solution sample and the indicator dye solution through the device.

In a ninth aspect, provided herein is an apparatus for measuring an amount of amount of free chlorine in an aqueous sample, the apparatus comprising the microfluidic device of the second aspect and one or more pumps configured to pump the aqueous sample and the indicator dye solution through the device.

In a tenth aspect, provided herein is an apparatus for measuring free chlorine and combined chlorine in an aqueous sample, the apparatus comprising the microfluidic device of either the third aspect or the sixth aspect and one or more pumps configured to pump the aqueous sample, the indicator dye solution, the combined chlorine release agent solution, the free chlorine measurement solution, and the combined chlorine measurement solution through the device.

In an eleventh aspect, provided herein is an apparatus for measuring an amount of amount of total chlorine in an aqueous sample, the apparatus comprising the microfluidic device of the fourth aspect and one or more pumps configured to pump the aqueous sample, the fluid containing a total chlorine release agent and the indicator dye solution through the device.

In a twelfth aspect, provided herein is an apparatus for measuring free chlorine and total chlorine in an aqueous sample, the apparatus comprising the microfluidic device of either the fifth aspect or the seventh aspect and one or more pumps configured to pump the aqueous sample, the indicator dye solution and the total chlorine release agent solution through the device.

In certain embodiments of the eighth to twelfth aspects, the flow rates of each of the solution sample, the aqueous sample, the indicator dye solution, the combined chlorine release agent solution, and/or the total chlorine release agent solution through the device are independently controllable.

In certain embodiments of the eighth to twelfth aspects, the apparatus further comprises a light source configured to project light through the optical window and the measuring chamber.

In certain embodiments of the eighth to twelfth aspects, the apparatus further comprises a detector configured to measure the absorbance of the solution in the measuring chamber.

In certain embodiments of the eighth to twelfth aspects, the apparatus further comprises a controller for controlling operation of any one or more of the pump(s), light source(s) and detector(s).

In certain embodiments of the eighth to twelfth aspects, the apparatus further comprises an inlet tube for connecting the aqueous sample inlet port to an aqueous sample source.

In certain embodiments of the eighth to twelfth aspects, the apparatus further comprises an inlet tube for connecting the indicator dye solution inlet port to a source of indicator dye solution.

In certain embodiments of the sixth aspect, the apparatus further comprises an inlet tube for connecting the combined chlorine release agent inlet port to a source of combined chlorine release agent.

In certain embodiments of the seventh aspect, the apparatus further comprises an inlet tube for connecting the total chlorine release agent inlet port to a source of total chlorine release agent.

In a thirteenth aspect, provided herein is a method of measuring the free chlorine content and combined chlorine content in an aqueous solution, the method comprising:

passing an aqueous sample to be analysed through the aqueous sample inlet port of the microfluidic device of the sixth aspect;

passing an indicator dye solution through the indicator dye solution inlet port of the microfluidic device of the fourth aspect;

mixing the aqueous sample and the indicator dye solution in the first microfluidic channel of the device of the sixth aspect under conditions suitable for the indicator dye to react with any free chlorine in the aqueous sample and produce a free chlorine measurement solution having a first reduced indicator dye concentration, measuring the first reduced indicator dye concentration optically in the free chlorine measuring chamber, transferring the free chlorine measurement solution from the free chlorine measuring chamber and mixing the free chlorine measurement solution and the solution containing the combined chlorine release agent in the second microfluidic channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, measuring the second reduced indicator dye concentration optically in the combined chlorine measuring chamber, and determining the free chlorine concentration and the combined chlorine concentration in the aqueous sample from the measured first reduced indicator dye concentration and the second reduced indicator dye concentration, respectively.

In a fourteenth aspect, provided herein is a method of measuring the free chlorine content and total chlorine content in an aqueous solution, the method comprising:

passing an aqueous sample to be analysed through the aqueous sample inlet port of the microfluidic device of the seventh aspect;

passing an indicator dye solution through the indicator dye solution inlet port of the microfluidic device of the seventh aspect;

mixing the aqueous sample and the indicator dye solution in the microfluidic channel of the device of the seventh aspect under conditions suitable for the indicator dye to react with any free chlorine in the aqueous sample and produce a free chlorine measurement solution having a first reduced indicator dye concentration;

passing a total chlorine release agent solution through the total chlorine release agent inlet port the microfluidic device of the seventh aspect;

mixing the a configured to receive a total chlorine release agent solution containing a total chlorine release agent capable of reacting with total combined or bound chlorine in the free chlorine measurement solution to produce a liberated total chlorine solution comprising chlorine liberated from the total chlorine;

mixing the free chlorine measurement solution and the total chlorine release agent solution in the microfluidic channel of the device of the seventh aspect under conditions suitable for the total chlorine release agent to react with any total combined or bound chlorine in the free chlorine measurement solution to produce a liberated total chlorine solution comprising chlorine liberated from the total chlorine;

mixing the liberated total chlorine solution and the indicator dye solution under conditions suitable for the indicator dye to react with any liberated total chlorine and produce a total chlorine measurement solution having a second reduced indicator dye concentration;

measuring the first reduced indicator dye concentration optically in the free chlorine measuring chamber;

measuring the second reduced indicator dye concentration optically in the total chlorine measuring chamber;

determining the free chlorine concentration and the total chlorine concentration in the aqueous sample from the measured first reduced indicator dye concentration and the second reduced indicator dye concentration, respectively.

In a fifteenth aspect, provided herein is a use of the microfluidic device of the third or sixth aspects to measure the free chlorine content and combined chlorine content in an aqueous solution.

In an sixteenth aspect, provided herein is a use of the microfluidic device of the fifth or seventh aspects to measure the free chlorine content and total chlorine content in an aqueous solution.

BRIEF DESCRIPTION OF THE FIGURES

Embodiments of the present invention will be discussed with reference to the accompanying figures wherein.

DESCRIPTION OF THE INVENTION

Figure 9:
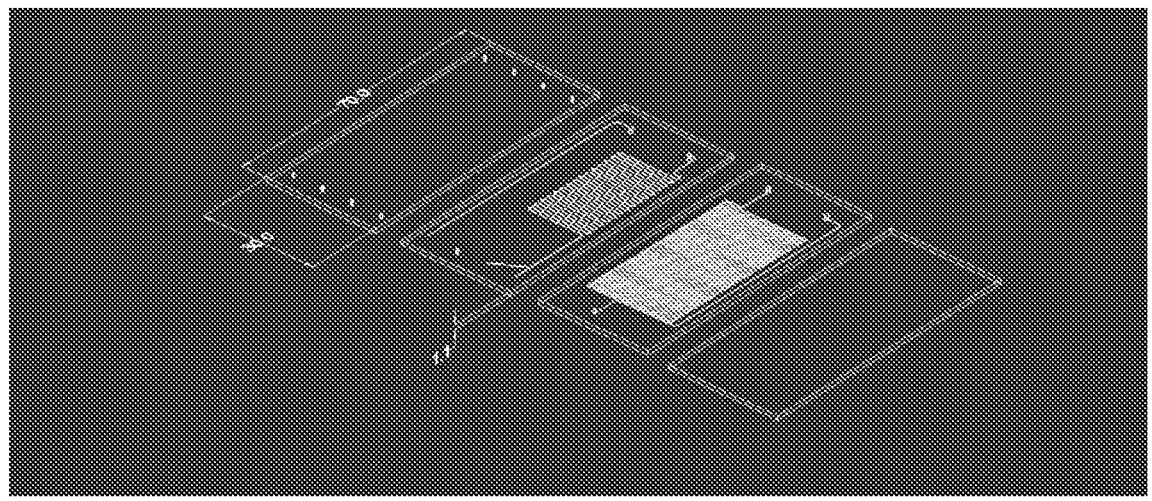
FIG. 9 shows a prototype of a 4-layer-microfluidic device. The dimensions are in "mm"
Figure 10:
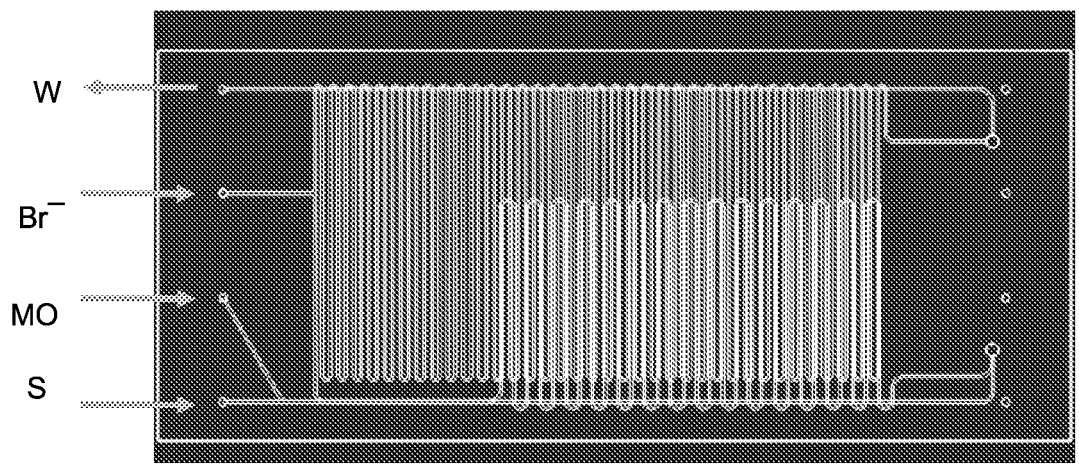
FIG. 10 shows a top view of a device for the separate free and combined chlorine measurement configuration. Arrows indicate the streams of sample (S), Methyl Orange (MO), Bromide ion reagent ($Br^-$) and waste stream (W)

The disclosure arises from the inventors' research into the use of microfluidic devices to measure chlorine concentration in aqueous samples including, but not limited to, swimming pool water, waste water, and municipal water supplies. Chlorine is only one example of an oxidant that can be measured using the microfluidic devices and other oxidants, such as oxygen, metal-containing oxidants, hydrogen peroxide, organic peroxides or singlet oxygen in solution can also be measured. In specific embodiments, the inventors' have developed microfluidic devices that are easy to use, reliable, cost effective and allow for continuous, real-time measurement or monitoring of free chlorine content and combined chlorine or real-time measurement or monitoring of free chlorine content and total chlorine content. FIGS. 9 and 10 show one embodiment of such a device.

Described herein is a microfluidic device for measuring an amount of an oxidant in a solution, the device comprising: a microfluidic substrate configured to mix a solution sample to be analysed with an indicator dye solution containing an indicator dye under conditions suitable for some of the indicator dye to react with any oxidant in the solution to produce an oxidant measurement solution having a reduced indicator dye concentration that is indicative of the amount of oxidant in the solution, the microfluidic substrate comprising an optical reading window through which the reduced indicator dye concentration in the oxidant measurement solution can be measured optically.

The device can be used to measure an amount of any one or more of a range of oxidants including, but not limited to, chlorine, oxygen, metal-containing oxidants, hydrogen peroxide, organic peroxides or singlet oxygen. The person skilled in the art will appreciate that indicator dyes that are oxidised by any of the listed oxidants are known and, provided oxidation of the dye results in a change in light absorbance, the amount of the oxidant can be measured. With this in mind, it is contemplated that combinations of oxidant and indicator dye other than those listed could also be used.

For each of further description, reference will now be made to embodiments for measuring chlorine. However, it will be appreciated that the following description is of illustrative embodiments only and is not intended to limit the scope of the disclosure and/or claims.

FIGS. 9 and 10 show one embodiment of a device for measuring free chlorine and combined chlorine in an aqueous sample. The device comprises:
  a) a microfluidic free chlorine measurement module configured to mix an aqueous sample to be analysed with a solution containing an indicator dye under conditions suitable for some of the indicator dye to react with any free chlorine in the aqueous sample to produce a free chlorine measurement solution having a first reduced indicator dye concentration that is indicative of the free chlorine concentration in the aqueous sample, the free chlorine measurement module comprising an optical reading window through which the first reduced indicator dye concentration in the free chlorine measurement solution can be measured optically; and
  b) a microfluidic combined chlorine measurement module configured to mix the free chlorine measurement solution from the free chlorine measurement microfluidic module with a fluid containing a combined chlorine release agent under conditions suitable for the combined chlorine release agent to react with any combined chlorine in the free chlorine measurement solution to produce liberated chlorine from the combined chlorine and for the indicator dye in the free chlorine measurement solution to react with any liberated chlorine to produce a combined chlorine measurement solution having a second reduced indicator dye concentration that is indicative of the combined chlorine concentration in the aqueous sample, the combined chlorine measurement module comprising an optical reading window through which the second reduced indicator dye concentration in the combined chlorine measurement solution can be measured optically.

More specifically, the device comprises a microfluidic free chlorine measurement module and a microfluidic combined chlorine measurement module,
  the free chlorine measurement module comprising a solid substrate comprising:
    a) an aqueous sample inlet port configured to receive an aqueous sample to be analysed for free chlorine and combined chlorine,
    b) an indicator dye solution inlet port configured to receive a solution containing an indicator dye capable of reacting with any free chlorine in the aqueous sample to produce a first reduced indicator dye concentration that is indicative of the free chlorine concentration in the aqueous sample,
    c) a first microfluidic flow channel in fluid communication with the aqueous sample inlet port and the indicator dye solution inlet port and configured to mix the aqueous sample and the indicator dye solution and to flow the combined fluids along the channel under conditions suitable for the indicator dye to react with any free chlorine and produce a free chlorine measurement solution having a first reduced indicator dye concentration,
    d) a free chlorine measuring chamber in fluid connection with the first microfluidic flow channel at a downstream end thereof and configured to receive the free chlorine measurement solution, the free chlorine measuring chamber comprising an optical reading window through which the first reduced indicator dye concentration in the free chlorine measurement solution can be measured optically,
    e) a transfer port in fluid communication with the free chlorine measuring chamber and/or the first microfluidic channel and configured to transfer the free chlorine measurement solution from the free chlorine measurement module to the combined chlorine measurement module,
  the combined chlorine measurement module comprising a solid substrate comprising:
    f) a free chlorine measurement solution inlet port configured to receive the free chlorine measurement solution from the transfer port,
    g) a combined chlorine release agent inlet port configured to receive a solution containing a combined chlorine release agent capable of reacting with any combined chlorine in the free chlorine measurement solution to produce liberated chlorine from the combined chlorine,
    h) a second microfluidic flow channel in fluid communication with the free chlorine measurement solution inlet port and the combined chlorine release agent inlet port and configured to mix the free chlorine measurement solution and the solution containing the combined chlorine release agent and to flow the combined fluids along the channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample,
    i) a combined chlorine measuring chamber in fluid connection with the second microfluidic channel at a downstream end thereof and configured to receive the combined chlorine measurement solution, the combined chlorine measuring chamber comprising an optical reading window through which the second reduced indicator dye concentration in the combined chlorine measurement solution can be measured optically, and
    j) a waste outlet port in fluid communication with the combined chlorine measuring chamber and/or the second microfluidic channel and configured to allow the combined chlorine measurement solution to exit the device.

Figure 10A:
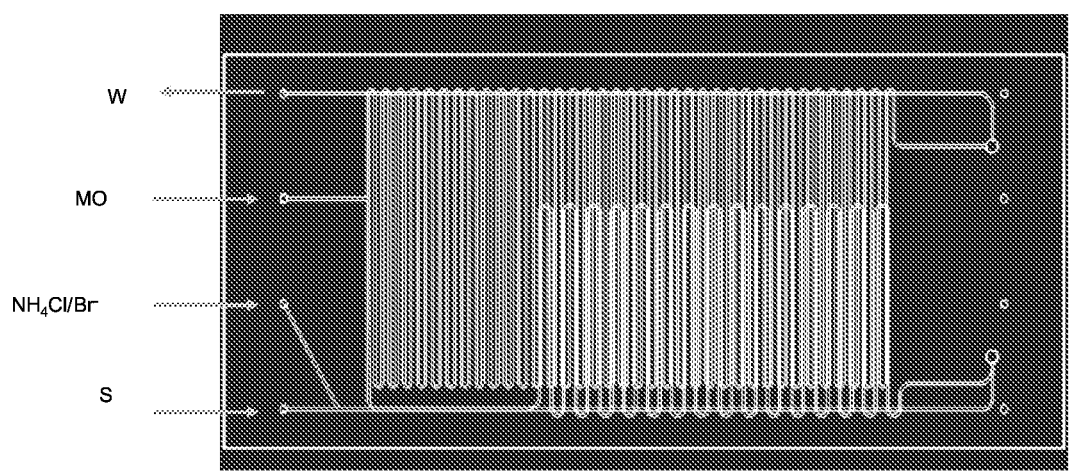
FIG. 10A shows a top view of a device for the free and total chlorine measurement configuration. Arrows indicate the streams of sample (S), Methyl Orange (MO), Ammonium chloride and Bromide ion reagent ($NH_4Cl/Br^-$) and waste stream (W)

FIG. 10A shows one embodiment of a device for measuring free chlorine and total chlorine in an aqueous sample. The device comprises:

- a microfluidic free chlorine measurement module configured to mix an aqueous sample to be analysed with an indicator dye solution containing an indicator dye under conditions suitable for some of the indicator dye to react with any free chlorine in the aqueous sample to produce a free chlorine measurement solution having a reduced indicator dye concentration that is indicative of the free chlorine concentration in the aqueous sample, the free chlorine measurement module comprising an optical reading window through which the first reduced indicator dye concentration in the free chlorine measurement solution can be measured optically; and
- a microfluidic total chlorine measurement module configured to mix the free chlorine measurement solution from the free chlorine measurement microfluidic module with a fluid containing a total chlorine release agent under conditions suitable for the total chlorine release agent to react with any total and/or bound chlorine in the free chlorine measurement solution to produce a liberated chlorine solution comprising chlorine liberated from the total chlorine and for an indicator dye solution containing an indicator dye to mix with the liberated chlorine solution under conditions suitable for some of the indicator dye to react with any liberated chlorine in the liberated chlorine solution to produce a total chlorine measurement solution having a reduced indicator dye concentration that is indicative of the total chlorine concentration in the aqueous sample, the total chlorine measurement module comprising an optical reading window through which the reduced indicator dye concentration in the total chlorine measurement solution can be measured optically.

More specifically, the device comprises a solid substrate comprising:

- an aqueous sample inlet port configured to receive an aqueous sample to be analysed for free chlorine and combined chlorine,
- a total chlorine release agent inlet port configured to receive a total chlorine release agent solution containing a total chlorine release agent capable of reacting with total combined and/or bound chlorine in the free chlorine measurement solution to produce a liberated total chlorine solution comprising chlorine liberated from the total chlorine,
- an indicator dye solution inlet port configured to receive an indicator dye solution containing an indicator dye capable of reacting with any free chlorine in the aqueous sample to produce a first reduced indicator dye concentration that is indicative of the free chlorine concentration in the aqueous sample, and/or capable of reacting with any liberated chlorine in the total chlorine solution to produce a second reduced indicator dye concentration that is indicative of the total chlorine concentration in the aqueous sample,
- a microfluidic flow channel in fluid communication with the aqueous sample inlet port, the total chlorine release agent inlet port and the indicator dye solution inlet port and configured to mix the aqueous sample and the indicator dye solution and to flow the combined fluids along the channel under conditions suitable for the indicator dye to react with any free chlorine and produce a free chlorine measurement solution having a first reduced indicator dye concentration,
- a free chlorine measuring chamber in fluid connection with the microfluidic flow channel at a downstream end thereof and configured to receive the free chlorine measurement solution, the free chlorine measuring chamber comprising an optical reading window through which the first reduced indicator dye concentration in the free chlorine measurement solution can be measured optically,
- the microfluidic flow channel also configured to mix the free chlorine measurement solution with the total chlorine release agent solution after the free chlorine measurement solution has been measured optically and to flow the combined fluids along the channel under conditions suitable for the total chlorine release agent to react with any combined and/or bound chlorine in the free chlorine measurement solution to produce a liberated total chlorine solution comprising chlorine liberated from the total chlorine, and to mix the liberated total chlorine solution and the indicator dye solution and to flow the combined fluids along the channel under conditions suitable for the indicator dye to react with any liberated total chlorine and produce a total chlorine measurement solution having a second reduced indicator dye concentration,
- a total chlorine measuring chamber in fluid connection with the microfluidic flow channel at a downstream end thereof and configured to receive the total chlorine measurement solution, the total chlorine measuring chamber comprising an optical reading window through which the second reduced indicator dye concentration in the total chlorine measurement solution can be measured optically, and
- a waste outlet port in fluid communication with the microfluidic flow channel and configured to allow the free chlorine measurement solution and/or the total chlorine measurement solution to exit the device.

As used herein, the term "microfluidic", and variants thereof, means that the chip, device, apparatus, substrate or related apparatus contains fluid control features that have at least one dimension that is sub-millimetre and, typically less than 100 μm, and greater than 1 μm. Furthermore, the term "microchannel", and variants thereof, means a channel having at least one dimension that is sub-millimetre and, typically less than 100 μm, and greater than 1 μm.

The device can take any suitable form. In the illustrated embodiments, the device is a unitary device comprising the microfluidic free chlorine measurement module and the microfluidic combined chlorine measurement module or the microfluidic free chlorine measurement module and the microfluidic total chlorine measurement module.

The device comprising the microfluidic free chlorine measurement module and the microfluidic combined chlorine measurement module shown in FIGS. 9 and 10 is a multilayer device comprising first and second outer chips and first and second intermediate chips. The free chlorine measurement module is formed between the first outer chip and the first intermediate chip, and the combined chlorine measurement module is formed between the second intermediate chip and the second outer chip. The chips are held together in a face to face manner to form the microfluidic device.

The device shown in FIGS. 9 and 10 can also be adapted for use as a microfluidic free chlorine measurement module and a microfluidic total chlorine measurement module as shown in FIG. 10A. The same multilayer device can be used, as shown in FIG. 10A, to measure free chlorine and total chlorine. In this use, the top microfluidic channel as shown does not play a functional role and the mixing of the aqueous sample with the indicator dye solution and then the mixing of the free chlorine measurement solution with the total chlorine release agent solution and subsequent mixing of the liberated total chlorine solution and the indicator dye solution occurs in the lower microfluidic channel (as depicted in FIG. 10A). If desired, a device having a different configuration and only having one microfluidic channel could be used to measure free chlorine and total chlorine. Thus, advantageously the same microfluidic device can be used to measure either free chlorine and combined chlorine, or free chlorine and total chlorine depending on port configurations and pumping schedules.

The chips are thin, rectangular plates that are formed from a suitable material. Materials suitable for the manufacture of chips are known in the art and may be chosen based on considerations such as cost, inertness or reactivity toward fluids and other materials that will be in contact with the chip, etc. In the present case, the chips may be formed from a transparent material which makes them suitable for forming the optical reading window on the free chlorine measuring chamber, the combined chlorine measuring chamber and the total chlorine measuring chamber. However, it is contemplated that the chips may be formed from non-transparent materials and the optical reading windows may be formed from a different transparent material. Some examples of suitable substrate materials include glass, quartz, metal (e.g. stainless steel, copper), silicon, and polymers. In certain embodiments, the substrate is a glass substrate. For example, Pyrex glass microfluidic chips may be suitable. Suitable polymeric substrates include polydimethylsiloxane (PDMS), polytetrafluoroethylene (PTFE), other perfluoropolyether (PFPE) based elastomers, polymethylmethacrylate (PMMA), silicone, and the like. The chips in the illustrated embodiments are rectangular in plan view but it is envisaged that they can be other shapes in plan view, such as circular, square, etc. The chips have a thickness adequate for maintaining the integrity of the microfluidic device.

In other embodiments that are not illustrated, the microfluidic device comprises two or more microfluidic substrates connected in series or parallel, with at least one of the substrates comprising the microfluidic free chlorine measurement module and at least one of the other substrates comprising the microfluidic combined chlorine measurement module or the microfluidic total chlorine measurement module. The two or more substrates may be connected to one another in series or parallel using suitable tubing and connectors, as is known in the art.

The aqueous sample inlet port, the indicator dye solution inlet port, the combined chlorine release agent inlet port and the total chlorine release agent inlet port are formed in the first outer chip. The inlet ports can take any suitable form. In the illustrated embodiments, the inlet ports are in the form of apertures or openings in the first outer chip.

In the free chlorine and combined chlorine measuring device, the transfer port and the free chlorine measurement solution inlet port are formed between the first intermediate chip and the second intermediate chip. Advantageously, the free chlorine measuring chamber forms the transfer port and the free chlorine measurement solution inlet port in the illustrated embodiments.

The first and second microfluidic flow channels are serpentine in form and are configured in width, height and length to give a desired residence time at a specific flow rate. The first microfluidic channel is configured so that the aqueous sample and the indicator dye solution have a residence time of from about 0.5 minutes to about 5 minutes at the specific flow rate used. Flow rates of from about 0.001 to about 20 mL/h may be used. In the illustrated embodiments, the first microfluidic flow channel has a length of about 530 mm.

The second microfluidic flow channel is configured so that the free chlorine measurement solution and the solution containing the combined chlorine release agent have a residence time of from about 1.5 minutes to about 10 minutes at the specific flow rate used. Again, flow rates of from about 0.001 to about 20 mL/h may be used. In the illustrated embodiments, the second microfluidic flow channel has a length of about 1700 mm.

The first and second microfluidic flow channels are formed on the chips using any of the methods for forming fluid microchannel networks are known in the art. For example, the chips can be fabricated using standard photolithographic and etching procedures including soft lithography techniques (e.g. see Shi J., et al., Applied Physics Letters 91, 153114 (2007); Chen Q., et al., Journal of Microelectromechanical Systems, 16, 1 193 (2007); or Duffy et al., Rapid Prototyping of Microfluidic Systems in Poly(dimethylsiloxane), Anal. Chem., 70 (23), 4974-4984 (1998)), such as near-field phase shift lithography, microtransfer moulding, solvent-assisted microcontact moulding, microcontact printing, and other lithographic microfabrication techniques employed in the semiconductor industry. Direct machining or forming techniques may also be used as suited to the particular chip. Such techniques may include hot embossing, cold stamping, injection moulding, direct mechanical milling, laser etching, chemical etching, reactive ion etching, physical and chemical vapour deposition, and plasma sputtering. The particular methods used will depend on the function of the particular microfluidic network, the materials used as well as ease and economy of production.

Variations of the size, shape and/or configuration of the microfluidic flow channels from those described are also envisaged. For example, the inlet microfluidic flow channels may be from 1 μm to 1000 μm in depth or width. The size of the microfluidic flow channels may also differ from one another in both dimensions.

The indicator dye can be selected depending on the oxidant to be measured. Common classes of indicator dyes include organic azo dyes, organic amine dyes, and thioninium dyes. Exemplary organic azo dyes include sodium 4-[(4-dimethylamino)phenyldiazenyl]benzenesulfonate (i.e. methyl orange). Exemplary organic amine dyes include DPD. Exemplary thioninium dyes include methylene blue.

For measurement of chlorine, methyl orange or buffered DPD could be used.

In the illustrated embodiments, the indicator dye is an organic azo dye, such as sodium 4-[(4-dimethylamino)phenyldiazenyl]benzenesulfonate (i.e. methyl orange or "MO"). MO is an organic azo-dye and a pH-indicator used for strong acid—strong base titrations. It has a $pK_a$(303K) value of 3.5 and is red for pH<3.1 and yellow for pH>4.4. MO is bleached in the presence of chlorine solution. This decolorization can be detected optically. Laitinen et al.[6] studied the products of the acidified MO reaction with free chlorine. He found that the manner of addition of reagents is crucial for the reaction stoichiometry. Taras[4] found 1:2 MO:$Cl_2$ mole ratio when adding MO to an excess of chlorine solution. Sollo et al.[5] found 1:1 when adding chlorine solution to an excess of MO. The pH of the acidified MO solution was 2.0-2.1. MO should be kept in excess when detecting at 505-510 nm since the products of oxidation can be chlorinated as well. The reaction of excess acidified MO with less than 3 ppm free chlorine is fast and completed within 1-1.5 min[5]. Chloramines react more slowly with MO and the reaction is accelerated by the addition of NaBr. The reaction is completed within 10 min[5].

It is not yet clear if the Br[−] ion is a catalyst for the reaction or reacts stoichometrically since no recovery studies for bromide were conducted in this work, but it can be assumed that free chlorine reacts with bromide ion to produce hypobromous acid/hypobromite which then reacts with the chloramines[7]. The temperature influence on the absorbance of MO was found to be negligible for 10-30° C.[5,7]. The spectrum of methyl orange is dependent on the pH of the sample and the pH-influence is greatly pronounced near the $pK_a$-value of MO. There are three points between 250-600 nm where the absorbance of MO does not depend on pH. These points are called isosbestic points. The isosbestic point at 469 nm is most suitable as detection wavelength for the bleaching reaction of MO with chlorine.

Figure 1:
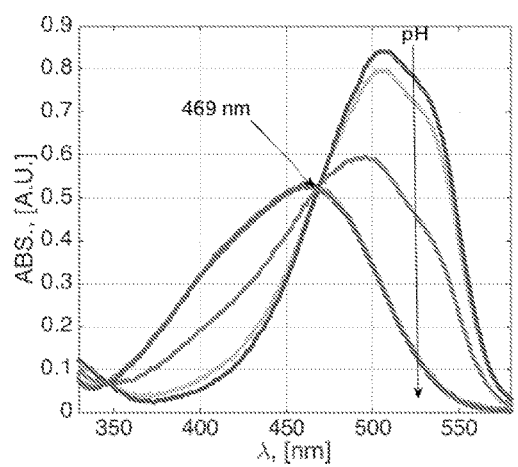
FIG. 1 shows spectra of MO in VIS at different pH: (a) from lab measurements; (b) from reference [9]
Figure 1:
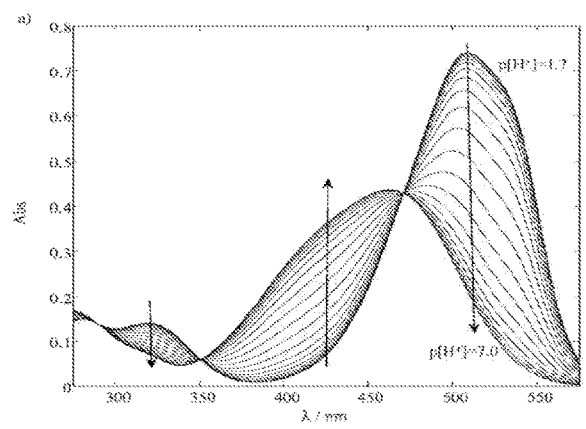
Figure 2:
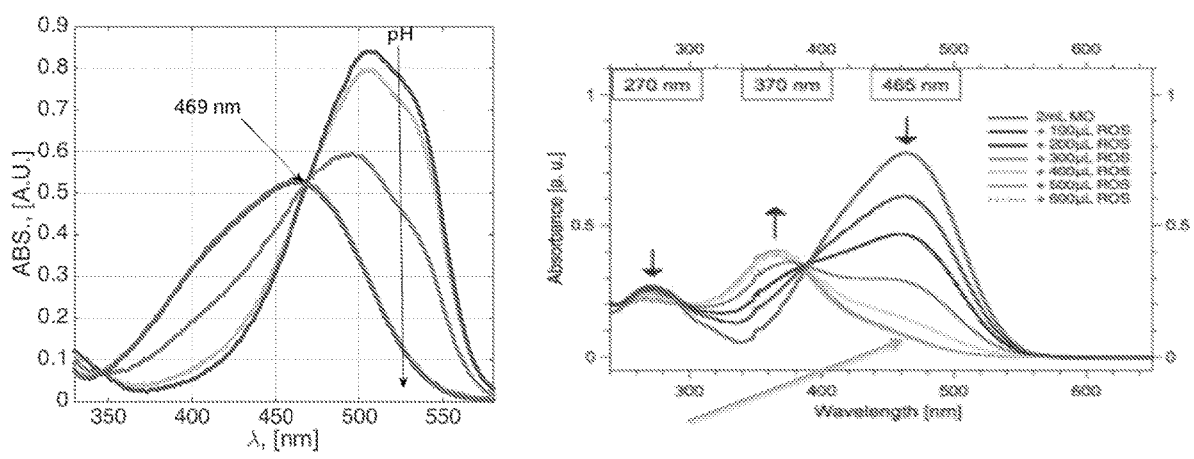
FIG. 2 shows the product(s) of oxidation of acidified MO6 (left), product(s) of oxidation for neutral pH MO (right). The oxidation products at neutral pH still have a measurable absorbance.
Figure 3:
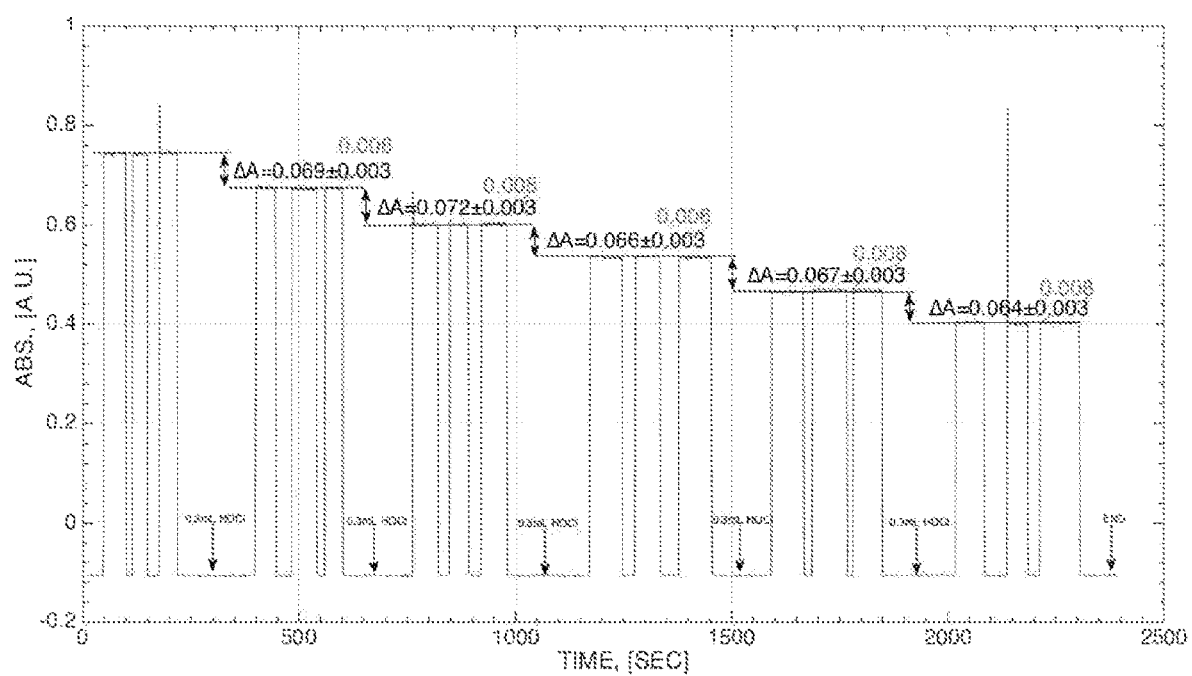
FIG. 3 shows the absorbance (@465.4 nm) of MO when adding the same aliquot of HOCl. The uncertainties marked with red contain the error due to dilution.

The detection peak at 505-510 nm is roughly 1.6 times higher than the detection peak of 465-469 nm. Thus, for acidic pH the sensitivity of this method is expected to be higher. Laitinen et al.[6] observed that after complete oxidation of MO the products of oxidation do not absorb at 505 nm. On the contrary the product(s) of oxidation do(es) absorb at the detection wavelength of 465-469 nm as seen from FIG. 2. When excess of MO is used this problem can be circumvented as seen in FIG. 3.

The concentration of the indicator dye in the solution containing an indicator dye may be from about 1 ppm to about 1000 ppm. In the case of MO, the concentration may be selected from the group consisting of 20, 30, 40 and 50 ppm.

The concentration of indicator dye is measured optically by measuring absorbance of the solution at a wavelength of from about 250 to about 600 nm.

For the reasons described previously, the absorbance of the solution is advantageously measured at a wavelength that corresponds with an isosbestic point where the absorbance does not substantially depend on the pH of the solution. Thus, the device and methods described herein allow for measurement of chlorine concentration under conditions in which the pH of the solution has little or minimal effect on the measurement. This is in contrast to prior art methods and represents a significant improvement over prior art methods.

The device described herein could be configured to operate with one optical window by switching on or off flow of the combined chlorine release agent solution to switch between measurement of free and combined chlorine. Thus, pulsed flow allows the use of a single optical window. In the same way, the indicator dye solution stream can be swapped with the total chlorine release agent containing excess of total chlorine generating agent to switch between measurement of free and total chlorine, as is the case with the device shown in FIG. 10A.

In certain embodiments, the device further comprises a reference measurement chamber configured to contain a sample of the indicator dye solution and to allow the absorbance of the indicator dye solution to be measured prior to contact with the aqueous sample so that it can be used as a reference for measurement. In these embodiments, any concentration of indicator dye could be used if the absorbance of the indicator dye solution before contact with the solution sample or the aqueous sample is measured. The reference measurement chamber could be in the form of a measuring chamber in fluid connection with the indicator dye solution inlet port and positioned upstream of the first microfluidic channel (i.e. between the indicator dye solution inlet port and the first microfluidic channel). The reference measurement chamber could alternatively be in the form of a microfluidic channel between the indicator dye solution inlet port and the first microfluidic channel. The reference measurement chamber may be formed in the same substrate as the microfluidic free chlorine measurement module and the microfluidic combined chlorine measurement module or it may be formed in a separate substrate which is in fluid connection (in series or parallel) with the one or more substrate(s) comprising the microfluidic free chlorine measurement module and the microfluidic combined chlorine measurement module. In each case, a light source and detector may be used to measure the absorbance of the indicator dye solution in the reference measurement chamber.

The combined chlorine release agent comprises a solution containing bromide ions (Br[−]), such as potassium bromide (KBr) solution.

The total chlorine release agent comprises a solution containing ammonia or ammonium halide, such as ammonium chloride ($NH_4Cl$) to bind any free chlorine that has reacted with the indicator dye solution to form bound free chlorine and a solution containing bromide ions (Br[−]), such potassium bromide (KBr), to release chlorine from the bound free chlorine and any combined chlorine.

Also provided herein is an apparatus for measuring free chlorine and combined chlorine in an aqueous sample, the apparatus comprising the microfluidic device as described herein and one or more pumps configured to pump the aqueous sample, the indicator dye solution, the combined chlorine release agent solution, the free chlorine measurement solution, and the combined chlorine measurement solution through the device.

Also provided herein is an apparatus for measuring free chlorine and total chlorine in an aqueous sample, the apparatus comprising the microfluidic device as described herein and one or more pumps configured to pump the aqueous sample, the indicator dye solution, the total chlorine release agent solution, the free chlorine measurement solution, the liberated total chlorine solution and the total chlorine measurement solution through the device.

The solutions may be transferred to the inlet ports and through the device under positive pressure provided by any suitable pump, by drawing the liquids through the device under vacuum, or by gravity feed. Devices for transferring liquids and gases to and through microfluidic networks are known in the art.

The flow rates of the indicator dye solution, the combined chlorine release agent solution and the total chlorine release agent solution are independently controllable. The apparatus may further comprise at least one flow controller. The flow controller may include one or more valves, flow diverters, or fluid diodes. The apparatus may further comprise a flow detector or sensor. There may be a feedback loop between the flow detector or sensor and the flow controller whereby the flow detector or sensor is configured to produce a signal which is transmitted to the flow controller in order to control the flow rate of the solution(s) via the flow controller.

The apparatus further comprises a light source configured to project light through the free chlorine measuring chamber.

The apparatus further comprises a spectrometer configured to measure the absorbance of the solution in the free chlorine measuring chamber.

The apparatus further comprises a light source configured to project light through the combined chlorine measuring chamber.

The apparatus further comprises a spectrometer configured to measure the absorbance of the solution in the combined chlorine measuring chamber.

The apparatus further comprises a light source configured to project light through the total chlorine measuring chamber.

The apparatus further comprises a spectrometer configured to measure the absorbance of the solution in the total chlorine measuring chamber.

The light source may be an LED light source. The detector may be a photodiode array spectrometer or a photodetector which is not wavelength selective. In the latter case, the incident light could be monochromatic.

The apparatus further comprises a controller for controlling operation of any one or more of the pump(s), light source(s) and spectrometer(s).

The apparatus further comprises an inlet tube for connecting the aqueous sample inlet port to an aqueous sample source.

The apparatus further comprises an inlet tube for connecting the indicator dye solution inlet port to a source of indicator dye solution.

The apparatus further comprises an inlet tube for connecting the combined chlorine release agent inlet port to a source of chlorine release agent.

The apparatus further comprises an inlet tube for connecting the total chlorine release agent inlet port to a source of total chlorine release agent.

Also disclosed herein is a method of measuring the free chlorine content and combined chlorine content in an aqueous solution, the method comprising:

passing an aqueous sample to be analysed through the aqueous sample inlet port of the microfluidic device of the sixth aspect;

passing an indicator dye solution through the indicator dye solution inlet port of the microfluidic device of the fourth aspect;

mixing the aqueous sample and the indicator dye solution in the first microfluidic channel of the device of the sixth aspect under conditions suitable for the indicator dye to react with any free chlorine in the aqueous sample and produce a free chlorine measurement solution having a first reduced indicator dye concentration, measuring the first reduced indicator dye concentration optically in the free chlorine measuring chamber, transferring the free chlorine measurement solution from the free chlorine measuring chamber and mixing the free chlorine measurement solution and the solution containing the combined chlorine release agent in the second microfluidic channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, measuring the second reduced indicator dye concentration optically in the combined chlorine measuring chamber, and determining the free chlorine concentration and the combined iorin concentration in the aqueous sample from the measured first reduced indicator dye concentration and the second reduced indicator dye concentration, respectively.

Also disclosed herein is a method of measuring the free chlorine content and total chlorine content in an aqueous solution, the method comprising:

passing an aqueous sample to be analysed through the aqueous sample inlet port of the microfluidic device of the seventh aspect;

passing an indicator dye solution through the indicator dye solution inlet port of the microfluidic device of the seventh aspect;

mixing the aqueous sample and the indicator dye solution in the microfluidic channel of the device of the seventh aspect under conditions suitable for the indicator dye to react with any free chlorine in the aqueous sample and produce a free chlorine measurement solution having a first reduced indicator dye concentration;

passing a total chlorine release agent solution through the total chlorine release agent inlet port the microfluidic device of the seventh aspect;

mixing the a configured to receive a total chlorine release agent solution containing a total chlorine release agent capable of reacting with total combined or bound chlorine in the free chlorine measurement solution to produce a liberated total chlorine solution comprising chlorine liberated from the total chlorine;

mixing the free chlorine measurement solution and the total chlorine release agent solution in the microfluidic channel of the device of the seventh aspect under conditions suitable for the total chlorine release agent to react with any total combined or bound chlorine in the free chlorine measurement solution to produce a liberated total chlorine solution comprising chlorine liberated from the total chlorine;

mixing the liberated total chlorine solution and the indicator dye solution under conditions suitable for the indicator dye to react with any liberated total chlorine and produce a total chlorine measurement solution having a second reduced indicator dye concentration;

measuring the first reduced indicator dye concentration optically in the free chlorine measuring chamber;

measuring the second reduced indicator dye concentration optically in the total chlorine measuring chamber;

determining the free chlorine concentration and the total chlorine concentration in the aqueous sample from the measured first reduced indicator dye concentration and the second reduced indicator dye concentration, respectively.

Also disclosed herein is a method of measuring the free chlorine content and combined chlorine content in an aqueous solution, the method comprising:

passing an aqueous sample to be analysed through the aqueous sample inlet port of the microfluidic device of the sixth aspect;

passing an indicator dye solution through the indicator dye solution inlet port of the microfluidic device of the fourth aspect;

mixing the aqueous sample and the indicator dye solution in the first microfluidic channel of the device of the sixth aspect under conditions suitable for the indicator dye to react with any free chlorine in the aqueous sample and produce a free chlorine measurement solution having a first reduced indicator dye concentration, measuring the first reduced indicator dye concentration optically in the free chlorine measuring chamber, transferring the free chlorine measurement solution from the free chlorine measuring chamber and mixing the free chlorine measurement solution and the solution containing the combined chlorine release agent in the second microfluidic channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, measuring the second reduced indicator dye concentration optically in the combined chlorine measuring chamber, and determining the free chlorine concentration and the combined iorin concentration in the aqueous sample from the measured first reduced indicator dye concentration and the second reduced indicator dye concentration, respectively.

Also disclosed herein is a method of measuring the free chlorine content and total chlorine content in an aqueous solution, the method comprising:

passing an aqueous sample to be analysed through the aqueous sample inlet port of the microfluidic device of the seventh aspect;

passing an indicator dye solution through the indicator dye solution inlet port of the microfluidic device of the seventh aspect;

mixing the aqueous sample and the indicator dye solution in the microfluidic channel of the device of the seventh aspect under conditions suitable for the indicator dye to react with any free chlorine in the aqueous sample and produce a free chlorine measurement solution having a first reduced indicator dye concentration;

passing a total chlorine release agent solution through the total chlorine release agent inlet port the microfluidic device of the seventh aspect;

mixing the a configured to receive a total chlorine release agent solution containing a total chlorine release agent capable of reacting with total combined or bound chlorine in the free chlorine measurement solution to produce a liberated total chlorine solution comprising chlorine liberated from the total chlorine;

mixing the free chlorine measurement solution and the total chlorine release agent solution in the microfluidic channel of the device of the seventh aspect under conditions suitable for the total chlorine release agent to react with any total combined or bound chlorine in the free chlorine measurement solution to produce a liberated total chlorine solution comprising chlorine liberated from the total chlorine;

mixing the liberated total chlorine solution and the indicator dye solution under conditions suitable for the indicator dye to react with any liberated total chlorine and produce a total chlorine measurement solution having a second reduced indicator dye concentration;

measuring the first reduced indicator dye concentration optically in the free chlorine measuring chamber;

measuring the second reduced indicator dye concentration optically in the total chlorine measuring chamber;

determining the free chlorine concentration and the total chlorine concentration in the aqueous sample from the measured first reduced indicator dye concentration and the second reduced indicator dye concentration, respectively.

Also disclosed herein is a method of measuring the free chlorine content and combined chlorine content in an aqueous solution, the method comprising:

passing an aqueous sample to be analysed through the aqueous sample inlet port of the microfluidic device of the sixth aspect;

passing an indicator dye solution through the indicator dye solution inlet port of the microfluidic device of the fourth aspect;

mixing the aqueous sample and the indicator dye solution in the first microfluidic channel of the device of the sixth aspect under conditions suitable for the indicator dye to react with any free chlorine in the aqueous sample and produce a free chlorine measurement solution having a first reduced indicator dye concentration, measuring the first reduced indicator dye concentration optically in the free chlorine measuring chamber, transferring the free chlorine measurement solution from the free chlorine measuring chamber and mixing the free chlorine measurement solution and the solution containing the combined chlorine release agent in the second microfluidic channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, measuring the second reduced indicator dye concentration optically in the combined chlorine measuring chamber, and determining the free chlorine concentration and the combined iorin concentration in the aqueous sample from the measured first reduced indicator dye concentration and the second reduced indicator dye concentration, respectively.

Also disclosed herein is a method of measuring the free chlorine content and total chlorine content in an aqueous solution, the method comprising:

passing an aqueous sample to be analysed through the aqueous sample inlet port of the microfluidic device of the seventh aspect;

passing an indicator dye solution through the indicator dye solution inlet port of the microfluidic device of the seventh aspect;

mixing the aqueous sample and the indicator dye solution in the microfluidic channel of the device of the seventh aspect under conditions suitable for the indicator dye to react with any free chlorine in the aqueous sample and produce a free chlorine measurement solution having a first reduced indicator dye concentration;

passing a total chlorine release agent solution through the total chlorine release agent inlet port the microfluidic device of the seventh aspect;

mixing the a configured to receive a total chlorine release agent solution containing a total chlorine release agent capable of reacting with total combined or bound chlorine in the free chlorine measurement solution to produce a liberated total chlorine solution comprising chlorine liberated from the total chlorine;

mixing the free chlorine measurement solution and the total chlorine release agent solution in the microfluidic channel of the device of the seventh aspect under conditions suitable for the total chlorine release agent to react with any total combined or bound chlorine in the free chlorine measurement solution to produce a liberated total chlorine solution comprising chlorine liberated from the total chlorine;

mixing the liberated total chlorine solution and the indicator dye solution under conditions suitable for the indicator dye to react with any liberated total chlorine and produce a total chlorine measurement solution having a second reduced indicator dye concentration;

measuring the first reduced indicator dye concentration optically in the free chlorine measuring chamber;

measuring the second reduced indicator dye concentration optically in the total chlorine measuring chamber;

determining the free chlorine concentration and the total chlorine concentration in the aqueous sample from the measured first reduced indicator dye concentration and the second reduced indicator dye concentration, respectively.

Advantageously, the steps are carried out under continuous flow conditions. A range of processing parameters can be precisely controlled by adjusting flow rate alone, e.g. volumetric throughput, extraction efficiency, and extraction time.

Alternatively, the steps can be carried out under pulsed flow conditions in which a first absorbance measurement is taken, the flow is stopped for a period, a further absorbance measurement is taken, and so on.

Chip Design

Figure 4:
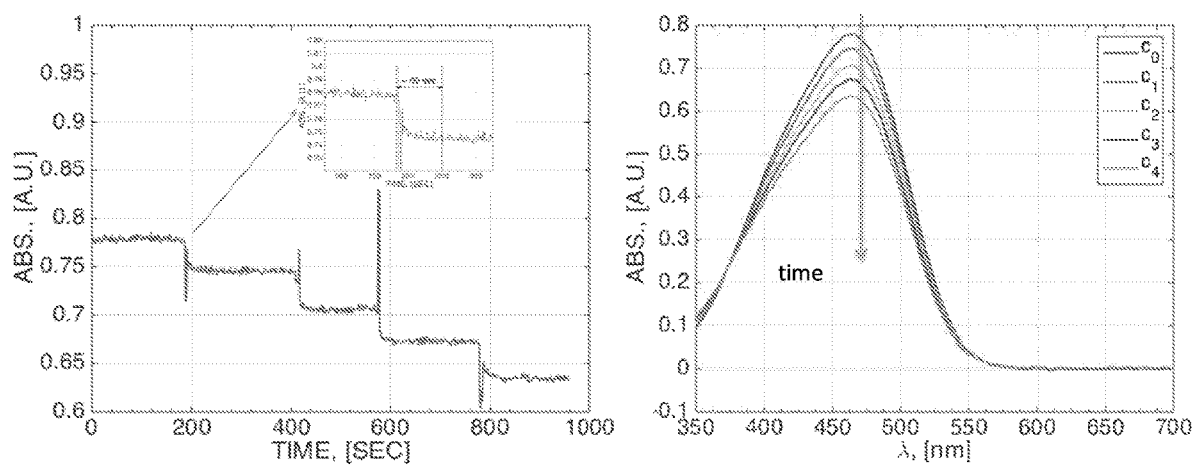
FIG. 4 shows the time strip (left) and the spectra (right) of Methyl Orange when reacted with hypochlorite solution, HOCl.
Figure 5:
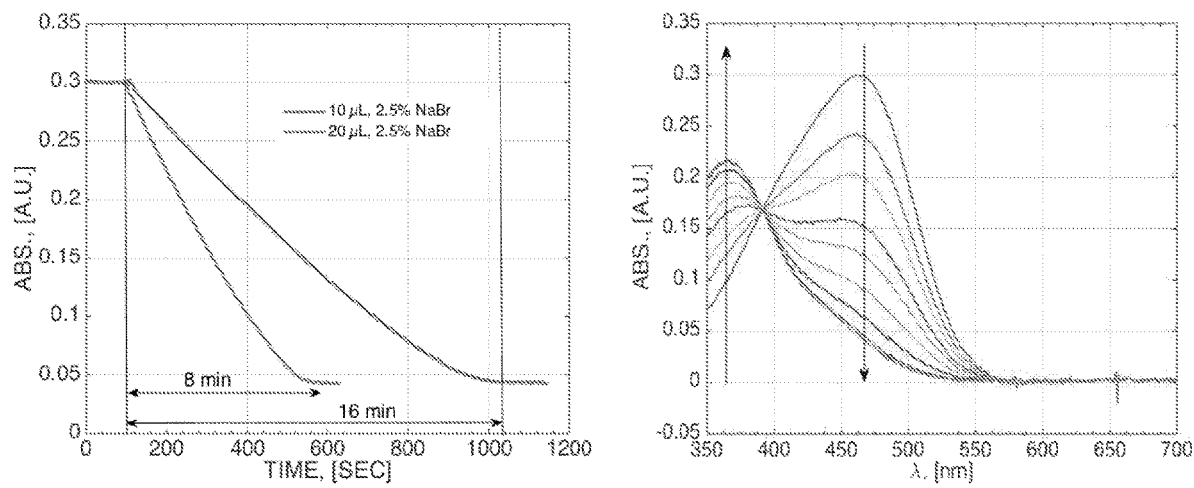
FIG. 5 shows the time strip (left) and the time resolved spectrum (right) of the reaction of chloramines with the addition of 10/20 µL of NaBr. The spectrum on the right refers to the addition of 20 µL of NaBr.

For the conceptual design of the device the relevant time scales for the reaction are of importance. Thus, the time needed for the reactions to complete was investigated in the bulk. The reaction of MO with free chlorine was observed to be completed in the range of 1 min as described by Sollo et al.[5] (refer to FIG. 4). For the reaction with chloramines the rate of the reactions depends on the concentrations of chloramines (for swimming pools ~0.2 ppm), on the pH and on the amount of Br⁻ present. The dependence on Br⁻ concentration is shown in FIG. 5. Doubling the amount of Br⁻ increases the rate ca. twice. The time scale found agrees with the literature and is the order of 10 min[5]. As seen from the time resolution of the spectrum of MO when reacted with chloramines there is an invariance point in the spectrum (~380 nm) for which the absorbance does not depend on the ratio of MO and oxidation product(s). This point can be used as a reference point for the chloramine calibration.

Sodium hypochlorite was purchased from Sigma Aldrich with the concentration of 4.00-4.99% available chlorine. The solution was standardized using a standard test method ASTM D2022-898. For the standardization $KIO_3$ was used (assay 99.8%±00.4%) as a primary standard. The measured quantities for the standardization are summarized in Table 1. The equation for the concentration of available chlorine is:

$$c_{cl_2} \text{ [mg/l]} = 3 \cdot \frac{M(Cl_2)}{M(Na_2S_2O_3 \cdot 5H_2O)} \cdot \frac{V(KIO_3, \text{aliquot}) \cdot m_{KIO_3} \cdot P_{KIO_3} \cdot V_{BP_2}}{V(Cl_2, \text{aliquot}) \cdot V(KIO_3) \cdot V_{BP_1}}$$

TABLE 1

Standardization of the sodium hypochlorite solution

| | |
|---|---|
| Mass of $KIO_3$ | 592.0 mg |
| Mass of $Na_2S_2O_3 \cdot 5H_2O$ | 20.5907 g |
| V($KIO_3$, volumetric flask) | 0.100 L |
| V(Equivalence point thiosulfate, 1) | 19.85 mL |
| V(Equivalence point hypochlorite, 2) | 15.95 mL |
| V($KIO_3$, aliquot) | 0.010 L |
| V($Na_2S_2O_3 \cdot 5H_2O$, volumetric flask) | 1 L |
| V($Cl_2$, aliquot) | 0.001 L |
| Purity of $KIO_3$ | 0.998 |

Figure 6:
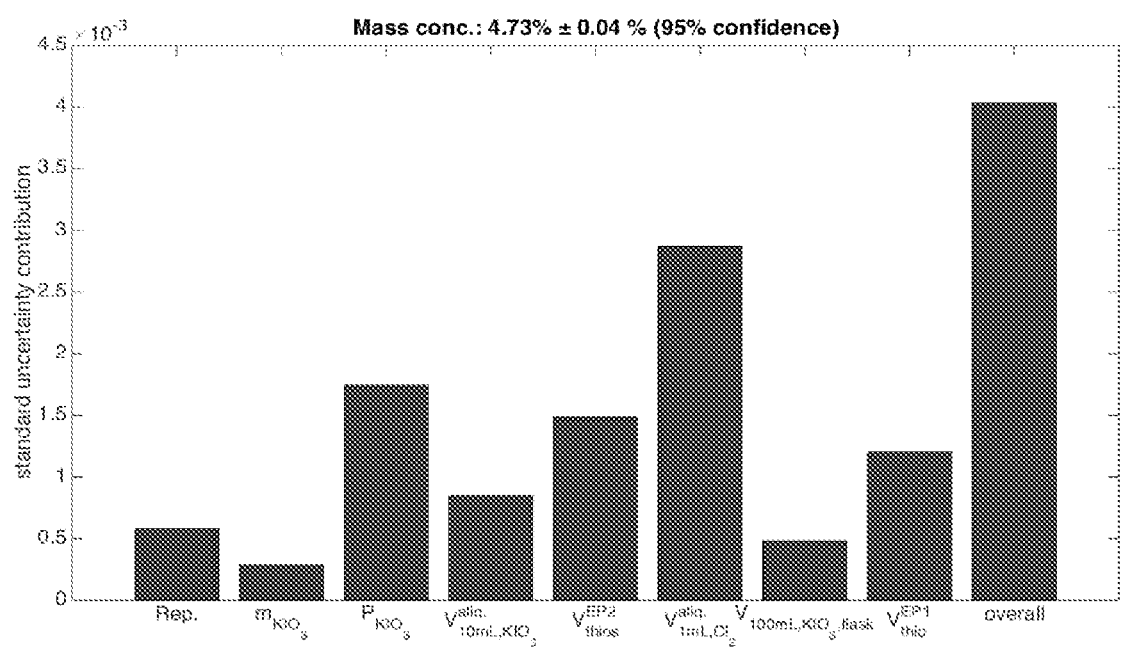
FIG. 6 shows the uncertainty budget for the standardization of NaOCl solution.

For the liberation of iodine 8 M $H_2SO_4$ acid was used by diluting ~95% sulfuric acid with equivalent amount water as suggested by Asakai et al.[10] A deliberate uncertainty evaluation of the titration procedure was carried out. The results are summarized in FIG. 6. The measured amount was found to be (4.73±0.04)% which is equivalent to (4.73±0.04)·10⁴ ppm.

Figure 7:
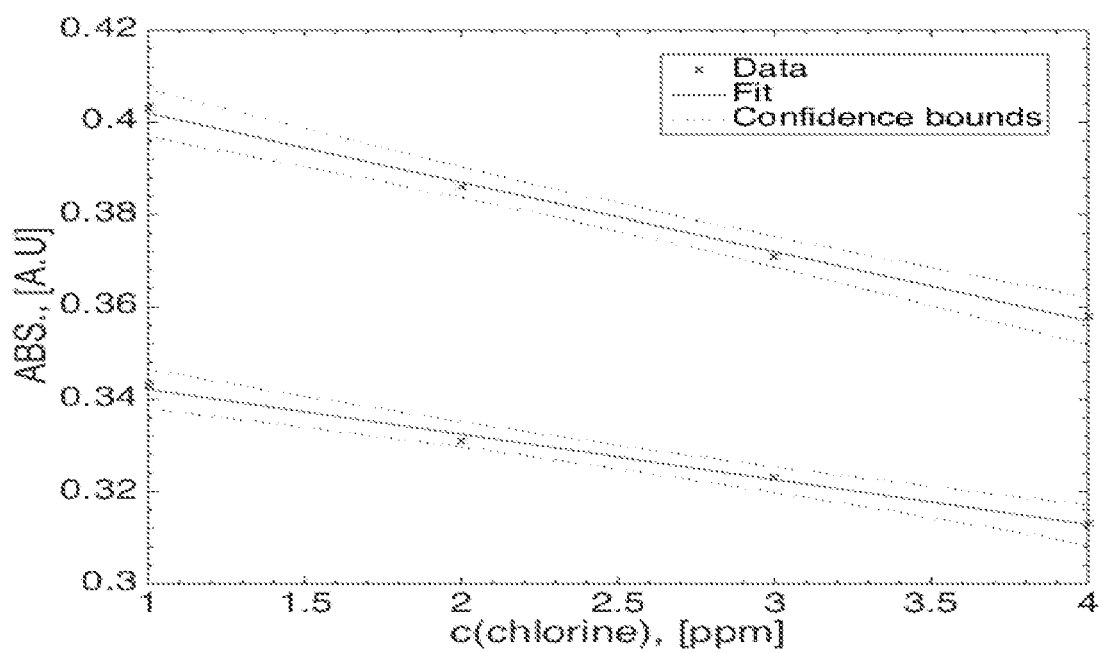
FIG. 7 shows the calibration of the MO bleaching reaction with different concentrations of chlorine.

For practical purposes this concentration solution needs to be diluted at least 1:10000 to span the desirable range of 1-10 ppm of free chlorine. For this dilution ratio 1 mL of 4.73% NaOCl was diluted to the mark in 100 mL volumetric flask. One milliliter of this solution was further diluted to 100 mL in another volumetric flask. This dilution introduces additional uncertainty in the concentration that needs to be accounted for. The resulting solution has concentration of 4.7 ppm. The solutions need to be diluted with MiliQ water and the water should not display "chlorine demand". This can be assumed if the total organic carbon (TOC) is below 20 ppb. Once the solution was standardized a correlation between the difference of absorbance of MO and chlorine concentration can be carried out. Standard chlorine solutions with concentrations of 4, 3, 2, and 1 ppm were prepared using KDS 200 Series syringe pumps to mix different amounts of chlorine and water. The MO-reagent was purchased from Merck (C.I. 13025) with concentration of 0.1% which is equivalent to 1000 ppm. MO was diluted to 40 and 100 ppm, respectively. The calibration graphs are shown in FIG. 7. The data of the calibration experiments is summarized in Table 2.

TABLE 2

Calibration experiments on MO

| 2.0 mm cuvette, 40 ppm MO, volume ratio MO:chlorine = 1:2 | | | | | |
|---|---|---|---|---|---|
| ABS., [A.U.] | 0.343 | 0.331 | 0.323 | 0.313 | |
| C (chlorine), [ppm] | 1 | 2 | 3 | 4 | $R^2 = 0.994$, slope = −0.0098 A.U./ppm |

| 2.0 mm cuvette, 100 ppm MO, volume ratio MO:chlorine = 1:2 | | | | | |
|---|---|---|---|---|---|
| ABS., [A.U.] | 0.403 | 0.386 | 0.371 | 0.358 | |
| C (chlorine), [ppm] | 1 | 2 | 3 | 4 | $R^2 = 0.996$, slope = −0.015 A.U./ppm |

Having studied the kinetics of the reactions in bulk gives insight for the conceptual microfluidic device. The residence time in the channel is controlled by the channel length. The sensitivity of the described decolorization method can be adjusted by controlling these parameters.

MO total concentration.

Total flow-rate. The total flow-rate cannot exceed certain limits (the residence time should be at least 1 min for free chlorine and at least 10 min for combined chlorine)

The methyl orange to chlorine flow-rate ratio.

Optical path length. For the proposed microfluidic device ~2.2 mm. Longer path length will inevitably increase the sensitivity The total MO concentration cannot exceed 1 mM as the solubility of MO in aqueous solutions is limited[9]. The higher the MO concentration compared to chlorine the lower the expected sensitivity since small variations in a high MO concentration will have small effect on the absorbance. High sensitivity is expected when the MO and chlorine concentrations are similar and a slight excess of MO is present. The total flow rate in the device should not exceed 1-1.5 mL/h to allow enough time for the reaction to proceed. However, any combination of channel geometry and flow rate could be used, provided the reaction time is sufficient. The MO to chlorine flow-rate ratio is the easiest to control and the uncertainty of this ratio influences directly the measurement. Low MO to chlorine flow-rate ratio increases the sensitivity to chlorine since more chlorine is present to react with MO.

Figure 8:
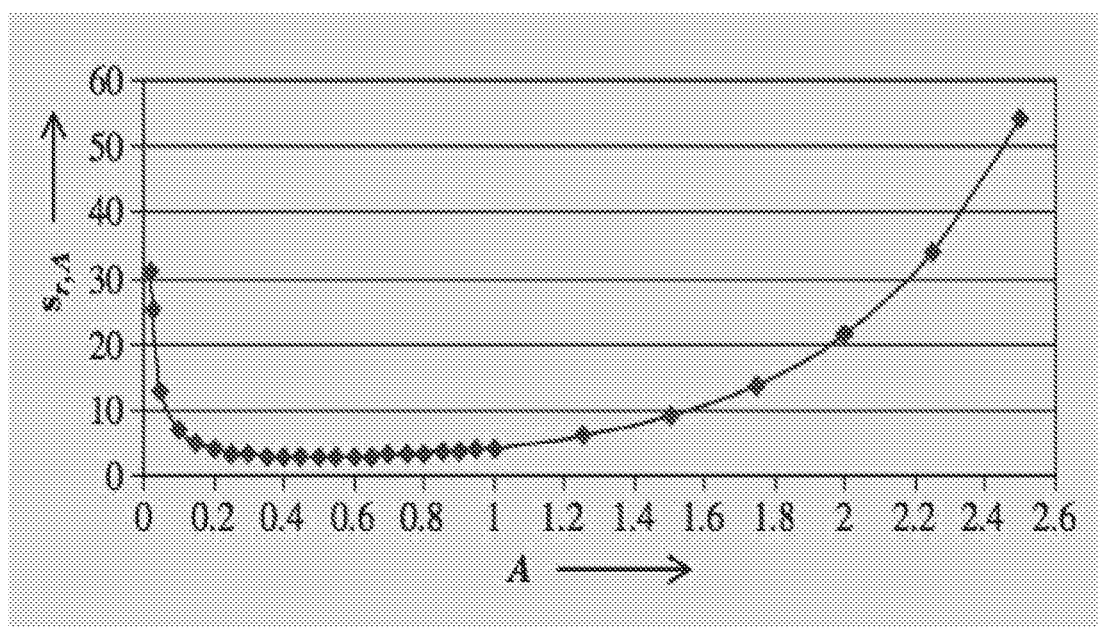
FIG. 8 shows the standard uncertainty of the Absorbance verses the Absorbance.[11] The ideal range is between 0.2-1.0.

Operating at low MO to chlorine flow-rate ratio and low MO concentration is not recommended since the absorbance will be very low and this can impact the uncertainty of the measurement. Ideally absorbance of 0.2-1.0 A.U. should be desired as seen from FIG. 8. Increasing the optical path length increases the sensitivity, but it is constrained by the thickness of the glass wafer ~1.1 mm.

Figure 11:
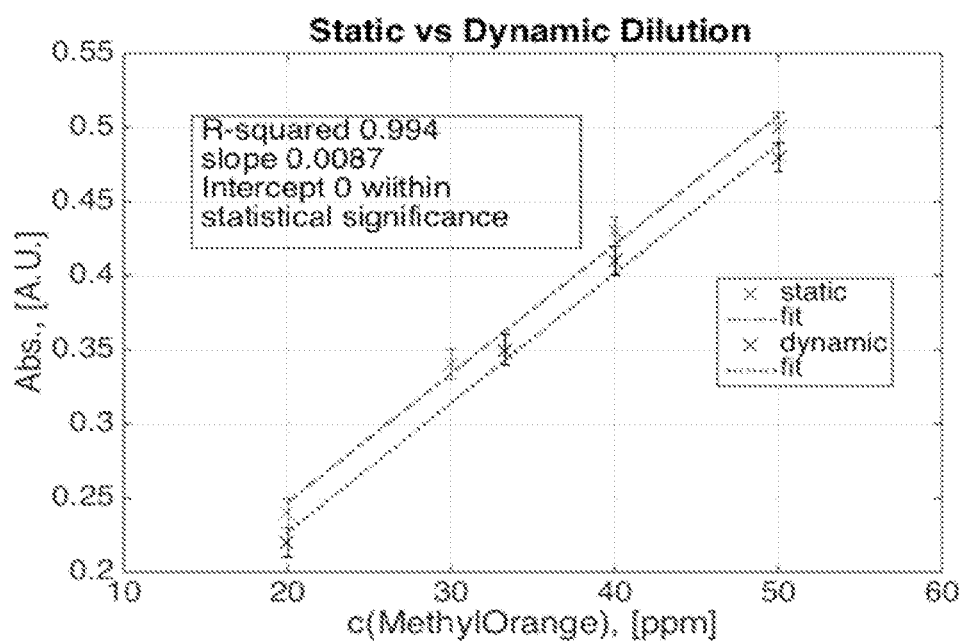
FIG. 11 shows the calibration of the device: static vs dynamic dilution.

The microfluidic device has specifications as shown in Table 3. The pressure drop was calculated assuming rectangular geometry. The actual device was fabricated at ANFF-SA using direct laser writing. The CAD prototype is shown in FIG. 10. A top view of the device is shown in FIG. 11. In the first reaction loop the free chlorine detection takes place. In the second reaction loop upon addition of NaBr the combined chlorine is measured.

TABLE 3

Device specifications

| Property | Layer | Unit | Typical Values |
| --- | --- | --- | --- |
| Residence time | 1 | min | 0.5-4.2 |
|  | 2 |  | 1.6-10.0 |
| Optical path length | 1 | mm | ~2.2 |
|  | 2 |  | ~2.2 |
| Length of channel | 1 | mm | 530 |
|  | 2 |  | 1700 |
| Depth of channels | 1, 2 | μm | 96-104 |
| Width of channels | 1, 2 | μm | 196-220 |
| Pressure drop | 2 | kPa | 7-42 |

To test the fabricated device a mass balance and calibration was performed. Standard MO solutions were prepared from the 0.1% stock solution with concentrations of 20, 30, 40 and 50 ppm. These solutions were fed at the (MO) port while keeping the other ports closed. This calibration is referred to as "static" since the dilution was done in the bulk outside of the device. Then both (S) and (MO) ports were fed with water and 100 ppm MO, respectively while keeping the (Br⁻) port closed. This situation is referred to as "dynamic" since the mixing is done in the chip by controlling the (MO) to (S) flow-rate ratio. Hamilton μSyringes of 250 and 500 μL were used. The static versus dynamic dilution is illustrated in FIG. 11. KDS 200 Series syringe pumps were used and Ocean Optics Flame™ spectrophotometer. The absorbance was measured at the first optical window. As seen from the figure, both static and dynamic dilutions result in the same slope. The small offset between the two lines is likely due to uncertainty in MO concentration since different MO solutions were used. However, this offset is statistically insignificant within 95% confidence. The agreement between static and dynamic dilution suggests that whatever goes in to the chip goes out, hence there is no accumulation of liquid in the chip.

Figure 12:
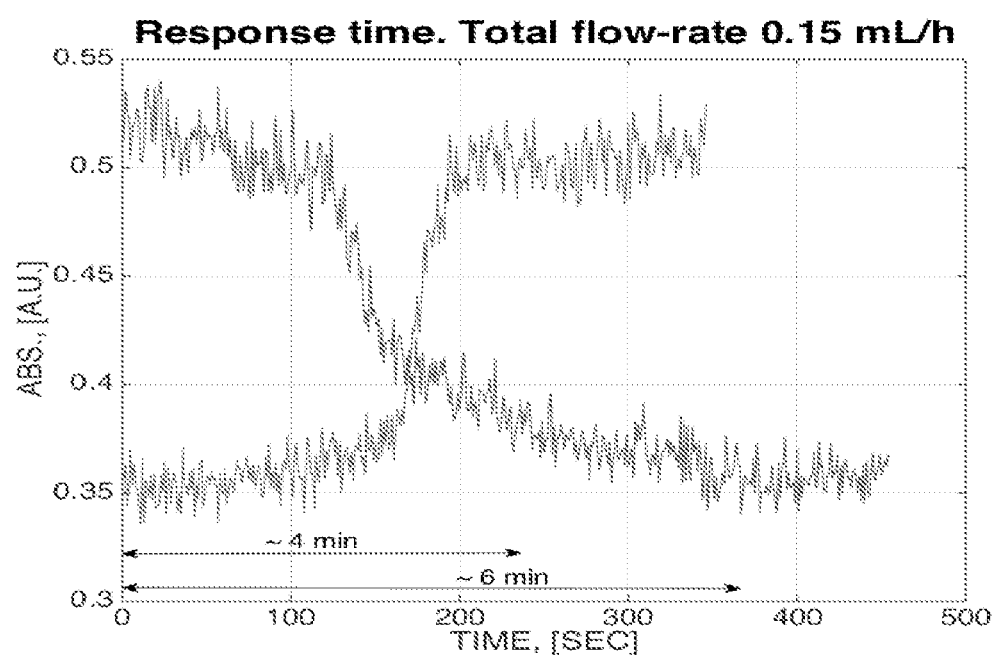
FIG. 12 shows the response time studies on the first optical window.

For the proper operation of the chip response time studies were conducted. The response time is formed from the residence time within the channel (known) and the time for the signal to reach the detector (unknown). For the first optical window the response times at 0.15 mL/h total flow-rate are shown in FIG. 12. Theoretical calculations based on the flow-rate alone predict a residence time of 4.2 min. The forward response time (red) agrees with the predicted response time. The backwards response time (blue) has roughly 2 min delay. This is most likely due to the residual pressure of the syringe pumps when the flow-rates were changed from high to low flow-rate.

Calibration of the Device (Free Chlorine)

Figure 13:
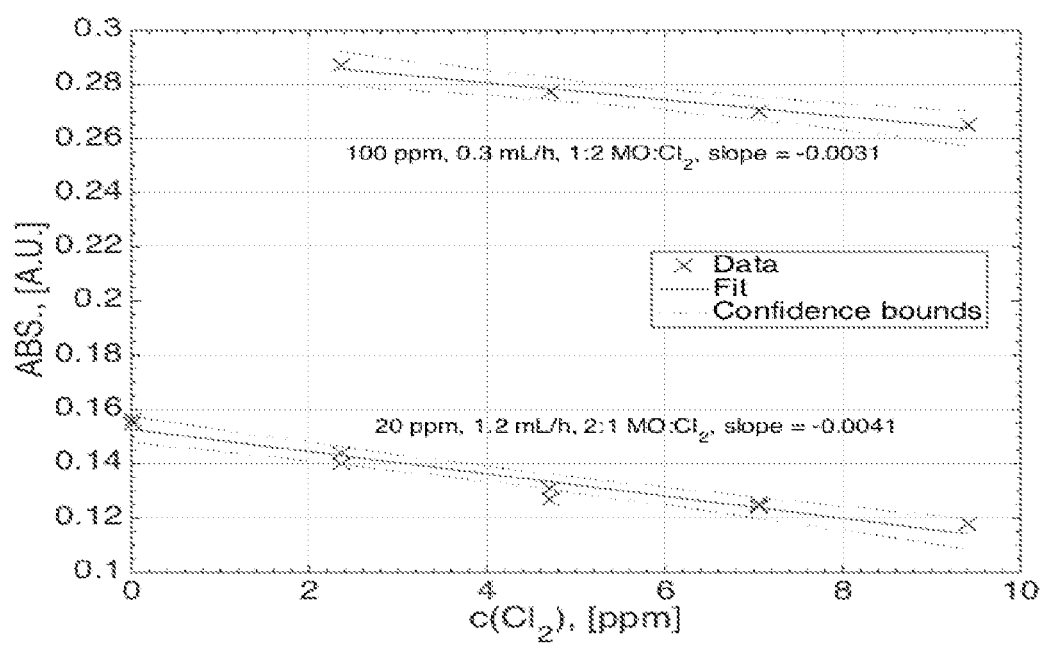
FIG. 13 shows the calibration graphs for the decolorizaton of MO with free chlorine.

The calibration graphs for 100 (20) ppm MO and flow-rate ratio of MO to chlorine of 1:2 (2:1) and total flow-rate of 0.3 (1.2) mL/h at the first (second) optical window are shown in FIG. 13. This figure shows that these parameters are indeed influencing the sensitivity (slope) having a 33% increase in the steepness of the slope for the 20 ppm relative to the 100 ppm. The oscillations are absent for the 20 ppm MO dataset with the signal approaching the noise level of the detector ±0.001 A.U.

Calibration of the Device (Total Chlorine)

1 mL 0.1% MO (1000 ppm) was diluted to 100 ppm with 9 mL deionised water. Then 108 mg anhydrous citric acid, 26 mg sodium chloride and 27 mg NaOH were dissolved in 10 mL MO (100) ppm. The colour changes from orange to red. The pH should be 4.

1 g Sodium bromide (NaBr) was dissolved in 10 mL buffered $NH_4Cl$ (34 ppm) solution to obtain the reagent for the total chlorine generation. The solution was then added 1/1 volume ratio to the samples containing 0, 1.18, 2.36, 4.73 and 9.46 ppm NaOCl or real pool samples, each. The total chlorine solutions are ready to be added to 100 ppm MO (pH 4) in a volume ratio of 1/1, 2/1, 3/1 and 4/1.

Calibration of the Device (Combined Chlorine)

The chloramines were produced from sodium hypochlorite and ammonium chloride. The reaction depends on the pH, temperature and hypochlorite to ammonia ratio.[2] For the fastest conversion of free chlorine to chloramines (primarily monochloramine) a pH between 7.4-8.4 must be maintained. This was achieved with sodium bicarbonate buffer with capacity of 100 mg/L. The pH of the resulting solution was measured to be 7.7. It is important that ammonium is present at least in 3 times the mole amount compared to hypochlorite. As seen from FIG. 5 the reaction of MO with chloramines takes place in the order of ~10 min. To study the reaction with chloramines, the device was flushed with high total flow-rate (5 mL/h (MO), 2.5 mL/h (Br⁻) and 5 mL/h (S)). The sample consisted of 4.7 ppm of chloramines. Then the pumps were turned off and the absorbance at 469 nm was resolved in time. The reaction takes place within 20-25 min.

Figure 14:
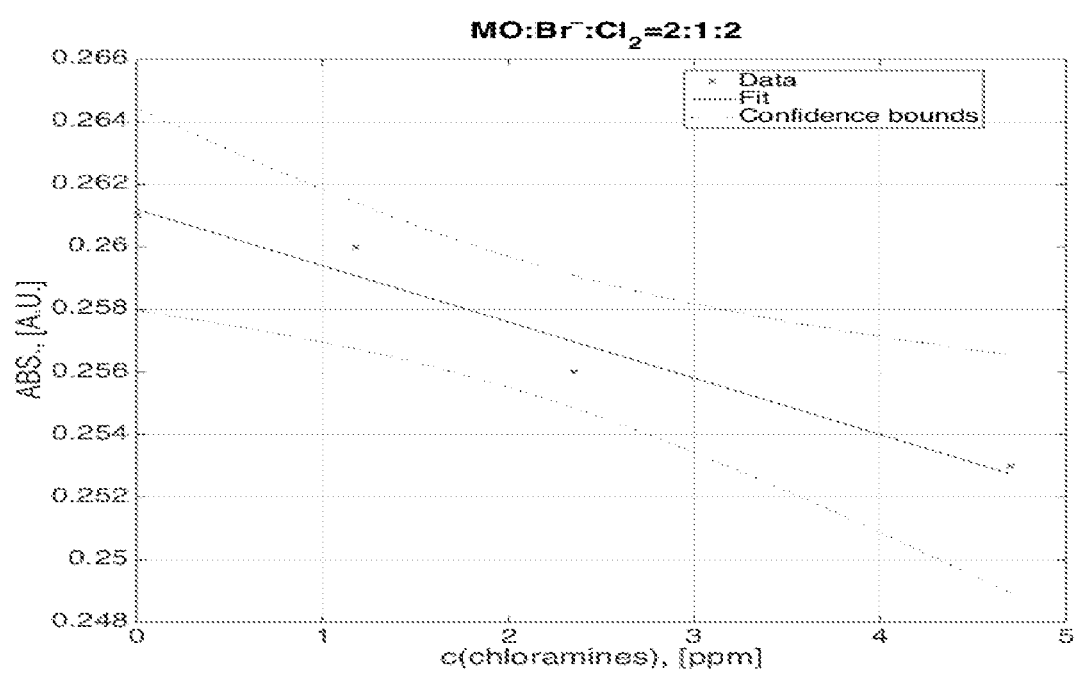
FIG. 14 shows the calibration graph for the reaction of MO with chloramines in the presence of $Br^-$ ions.
Figure 15:
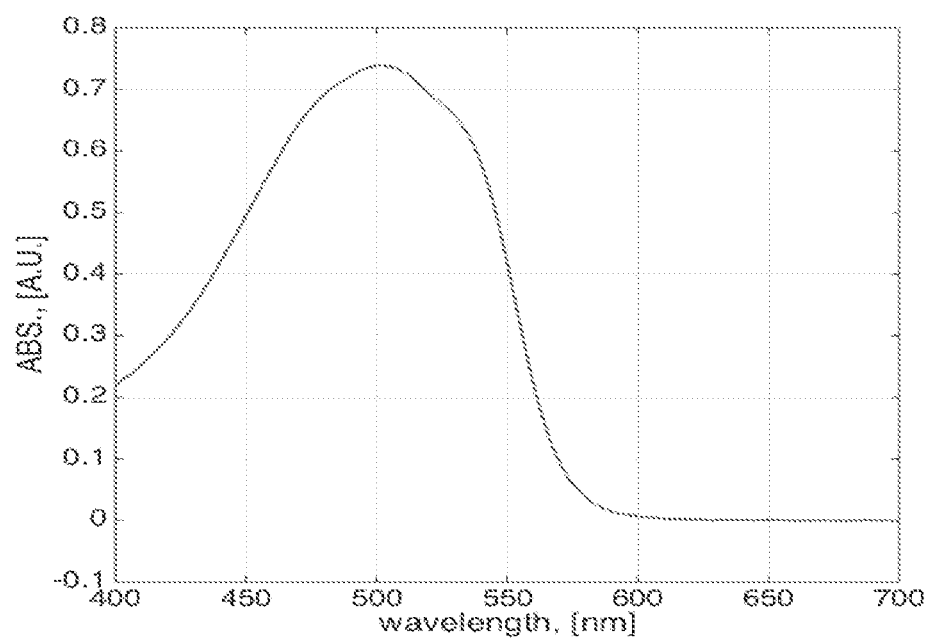
FIG. 15 shows the spectrum of MO (1000 ppm) with 4.7 ppm of chloramines and 2.5% NaBr (pH=2). The volume ratios are $MO:Br^-:chloramines=1:2:10$.
Figure 16:
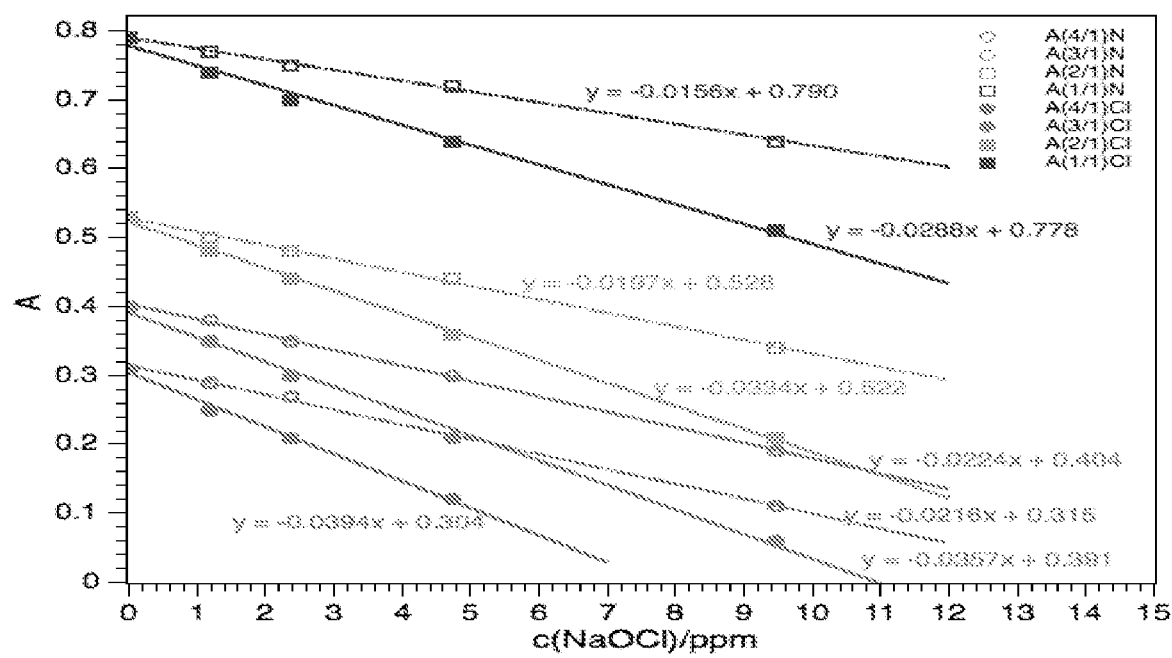
FIG. 16 shows the calibration graph for the decolorization of MO with free and total chlorine in the volume ratios of S/MO=1/1, 2/1 and 3/1 at pH 4 and in the bulk. The total chlorine solutions were mixed with excess (>10 equivalents of free chlorine) of 10% NaBr containing $NH_4Cl$ solution in a volume ratio of 1/1.
Figure 17:
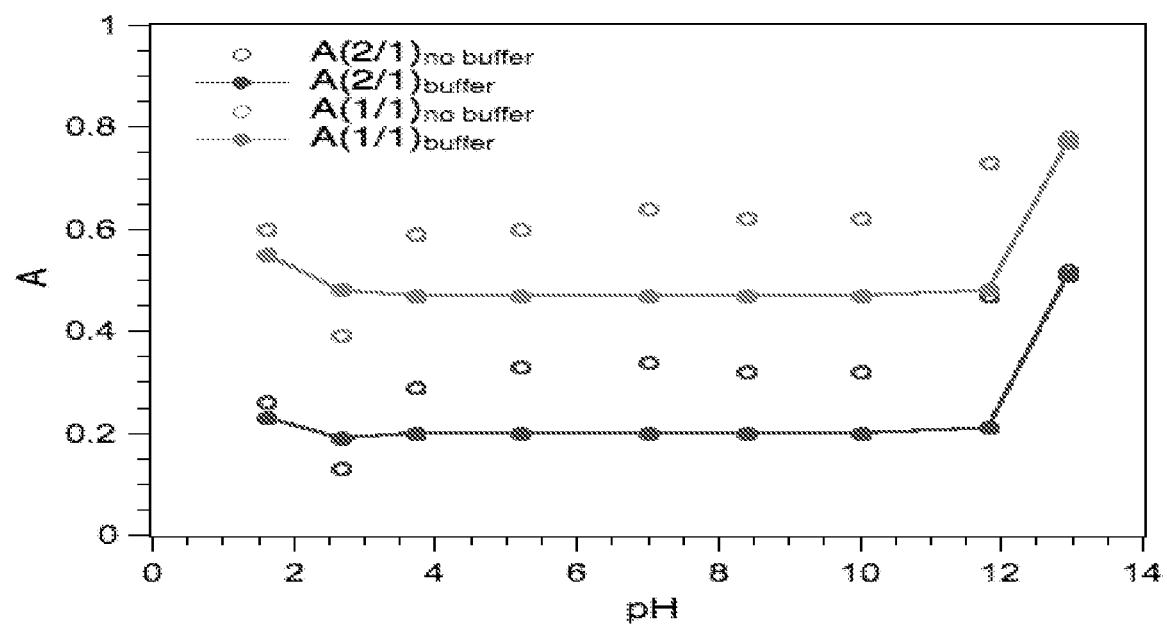
FIG. 17 shows the stabilized absorbance of MO with 4.71 ppm NaOCl in the pH range 2-12. MO was buffered with a 0.1 molar PBS (phosphate buffered saline) solution.
Figure 18:
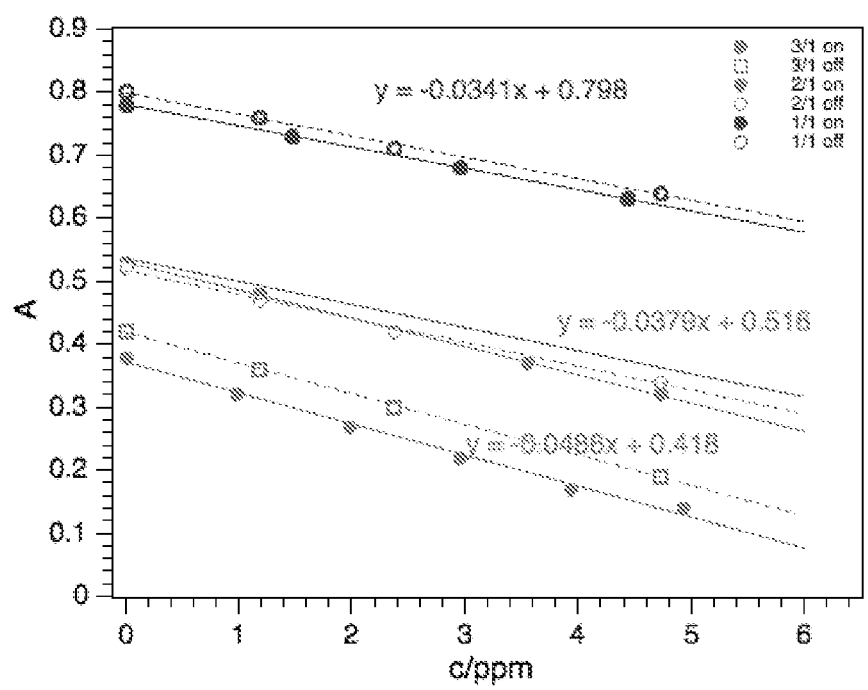
FIG. 18 shows the calibration graph of the decolorization of free chlorine on the device at sample/MO flow ratios of 1/1, 2/1 and 3/1 and compared with the results obtained off-chip in 2 mm quartz cuvette.

Since the rate of the reaction between MO and chloramines depends critically on the concentrations of chloramines and these are expected to be small in the sample (ca. 0.2 ppm) then the rate of the reaction is low. A calibration line was constructed using the steady state values obtained from the time strip chart. This is shown in FIG. 14.

To increase the rate of the reaction the solution of NaBr was acidified with 0.5 M HCl solution. When using 0.5 mL/h MO (1000 ppm), 1 ml/h 2.5% NaBr (pH=2 adjusted with HCl) and 5 ml/h MiliQ water the absorbance of the dye is 0.768 A.U. When the sample syringe was loaded with 4.7 ppm chloramines the absorbance of the sample was measured to be 0.640 A.U. The absorbance difference of 0.128 A.U./4.7 ppm or 0.027 A.U./ppm is high enough to differentiate tenths of a ppm, but not high enough to differentiate to the first decimal point of the ppm, because 0.0027 A.U./0.1 ppm is close enough to the detector limit of detection. The spectrum of the species is shown in FIG. 19.

Very good calibration results were obtained when the chlorine to MO volume flow ratio was 20:1 (0.4 mL/h MO (1000 ppm), 1 mL/h Br⁻ (pH=2), 8 mL/h Sample). The results are shown in FIGS. 21(a) and (b) with the time chart of the calibration. The slope of the calibration graph ($R^2$=0.999) was −0.039 A.U./ppm which permits differentiations of the chloramines to the first significant digit, i.e. −0.0039 A.U/0.1 ppm.

The microfluidic device disclosed herein has some considerable advantages for its application for continuous chlorine monitoring. The chip is cheap and disposable and tiny volumes of reagents are needed. Furthermore, the design is versatile: several orders of magnitude in chlorine concentrations can be spanned depending on the total MO concentration, the flow-rate ratio and the total flow-rate. The detection wavelength at 469 nm is invariant to pH changes and thus minor deviations in pH of the sample do not interfere with the measurement. When the device is in operation a second wavelength monitoring (700 nm is good since water does not absorb) is recommended since a bubble in the optical window shifts the baseline and this can be monitored online.

The packaged device consists of the microfluidic chip and peripherals. The peripherals are important for the calibration and response time of the device.

The advantage of this device versus a commercial DPD-based continuous device HACH's Cl17$^3$ is seen from Table 4. The total costs of the reagent consumption per year assuming 24/7 operation are negligible compared to the Cl17 annual reagent costs.

TABLE 4

Device specifications and comparison with HACH's C117 chlorine analyzer.

|  | Unit | Typical Values |
| --- | --- | --- |
| What goes in? |  |  |
| Sample | mL/h | 0.05-0.8 |
| Reagent (MO) |  | 0.05-0.8 |
| Reagent (Br$^-$) |  | 0.05-0.1 |
| What goes out? |  |  |
| Waste | mL/h | 0.15-1.25 (total) |
| Operation time |  |  |
| 24 h a day for 1 year | h | 8760 |

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

REFERENCES

[1] Swimming pool and spa water chemistry, Missouri Department of Health
[2] White's Handbook of Chlorination, Wiley, 2010
[3] http://www.hach.com/asset-get.download.jsa?id=20055535006 Accessed 2016 Feb. 8
[4] Taras, M., *Anal Chem.*, vol. 19, pp. 342, (1947)
[5] Sollo et al., *J Am Wat Assoc.* vol. 57, pp. 1575 (1965)
[6] Laitinen et al. vol. 55, pp. 920, *Anal Chem.* (1972)
[7] Sollo et al., *Environ Sci Tech.* vol. 5, pp. 240 (1971)
[8] ASTM D2022-89 (2008), ASTM International, West Conshohocken, Pa., 2008
[9] Boily J-F., *J Sol Chem.* vol. 34, pp. 1387 (2005)
[10] Asakai et al., *Anal Chim Acta.* vol. 689, pp. 34 (2011)
[11] Einax J. W Meichenbächer R. Challenges in Analytical Quality Assurance, Springer, 2011

The reference to any prior art in this specification is not, and should not be taken as, an acknowledgement of any form of suggestion that such prior art forms part of the common general knowledge.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

The invention claimed is:

1. A microfluidic device for measuring free chlorine and combined chlorine in an aqueous sample, the device comprising a microfluidic free chlorine measurement module and a microfluidic combined chlorine measurement module, the free chlorine measurement module comprising a solid substrate comprising:

an aqueous sample inlet port configured to receive an aqueous sample to be analysed for free chlorine and combined chlorine, an indicator dye solution inlet port configured to receive an indicator dye solution containing an indicator dye capable of reacting with any free chlorine in the aqueous sample to produce a first reduced indicator dye concentration that is indicative of the free chlorine concentration in the aqueous sample, a first microfluidic flow channel in fluid communication with the aqueous sample inlet port and the indicator dye solution inlet port and configured to mix the aqueous sample and the indicator dye solution and to flow the combined fluids along the channel under conditions suitable for the indicator dye to react with any free chlorine and produce a free chlorine measurement solution having a first reduced indicator dye concentration, a free chlorine measuring chamber in fluid connection with the first microfluidic flow channel at a downstream end thereof and configured to receive the free chlorine measurement solution, the free chlorine measuring chamber comprising an optical reading window through which the first reduced indicator dye concentration in the free chlorine measurement solution can be measured optically, a transfer port in fluid communication with the free chlorine measuring chamber and/or the first microfluidic channel and configured to transfer the free chlorine measurement solution from the free chlorine measurement module to the combined chlorine measurement module, the combined chlorine measurement module comprising a solid substrate comprising:

a free chlorine measurement solution inlet port configured to receive the free chlorine measurement solution from the transfer port, a combined chlorine release agent inlet port configured to receive a solution containing a combined chlorine release agent capable of reacting with any combined chlorine in the free chlorine measurement solution to produce liberated chlorine from the combined chlorine, a second microfluidic flow channel in fluid communication with the free chlorine measurement solution inlet port and the combined chlorine release agent inlet port and configured to mix the free chlorine measurement solution and the solution containing the combined chlorine release agent and to flow the combined fluids along the channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, a combined chlorine measuring chamber in fluid connection with the second microfluidic channel at a downstream end thereof and configured to receive the combined chlorine measurement solution, the combined chlorine measuring chamber comprising an optical reading window through which the second reduced indicator dye concentration in the combined chlorine measurement solution can be measured optically, and a waste outlet port in fluid communication with the combined chlorine measuring chamber and/or the second microfluidic channel and configured to allow the combined chlorine measurement solution to exit the device.

2. The microfluidic device of claim 1, wherein the microfluidic device is a unitary device comprising the microfluidic free chlorine measurement module and the microfluidic combined chlorine measurement module.

3. The microfluidic device of claim 1, wherein the microfluidic device is a multilayer microfluidic device comprising a first and second outer chips and first and second intermediate chips and wherein the free chlorine measurement module is formed between the first outer chip and the first intermediate chip, and the combined chlorine measurement module is formed between the second intermediate chip and the second outer chip.

4. The microfluidic device of claim 3, wherein the aqueous sample inlet port, the indicator dye solution inlet port and the combined chlorine release agent inlet port are formed in the first outer chip.

5. The microfluidic device of claim 4, wherein the transfer port and the free chlorine measurement solution inlet port are formed between the first intermediate chip and the second intermediate chip.

6. The microfluidic device of claim 5, wherein the free chlorine measuring chamber forms the transfer port and the free chlorine measurement solution inlet port.

7. The microfluidic device of claim 1, wherein the microfluidic device comprises two or more microfluidic substrates connected in series or parallel, with at least one of the substrates comprising the microfluidic free chlorine measurement module and at least one of the other substrates comprising the microfluidic combined chlorine measurement module.

8. The microfluidic device of claim 1, wherein the first microfluidic flow channel is configured so that the aqueous sample and the indicator dye solution have a residence time of from 0.5 minutes to 5 minutes at the specific flow rate used.

9. The microfluidic device of claim 8, wherein the second microfluidic flow channel is configured so that the free chlorine measurement solution and the solution containing the combined chlorine release agent have a residence time of from 1.5 minutes to 10 minutes at the specific flow rate used.

10. A method of measuring the free chlorine content and combined chlorine content in an aqueous solution using the microfluidic device of claim 1, the method comprising:

passing an aqueous sample to be analysed through the aqueous sample inlet port of the microfluidic device;

passing an indicator dye solution through the indicator dye solution inlet port of the microfluidic device;

mixing the aqueous sample and the indicator dye solution in the first microfluidic channel of the microfluidic device under conditions suitable for the indicator dye to react with any free chlorine in the aqueous sample and produce a free chlorine measurement solution having a first reduced indicator dye concentration, measuring the first reduced indicator dye concentration optically in the free chlorine measuring chamber, transferring the free chlorine measurement solution from the free chlorine measuring chamber and mixing the free chlorine measurement solution and the solution containing the combined chlorine release agent in the second microfluidic channel under conditions suitable for the combined chlorine release agent to react with combined chlorine in the free chlorine measurement solution to produce liberated chlorine and for the indicator dye in the free chlorine measurement solution to react with any liberated chlorine to produce a combined chlorine measurement solution having a second reduced indicator dye concentration that is indicative of the combined chlorine concentration in the aqueous sample, measuring the second reduced indicator dye concentration optically in the combined chlorine measuring chamber, and determining the free chlorine concentration and the combined chlorine concentration in the aqueous sample from the measured first reduced indicator dye concentration and the second reduced indicator dye concentration, respectively.

* * * * *